(12) United States Patent
Demar et al.

(10) Patent No.: US 9,804,727 B2
(45) Date of Patent: Oct. 31, 2017

(54) FLEXIBLE DISPLAY OF VISUAL CONTENT ON MULTIPLE DISPLAY DEVICES

(75) Inventors: Richard Demar, Hinesburg, VT (US); Jost Eckhardt, Pawlet, VT (US); Scott David Moore, Manchester Center, VT (US)

(73) Assignee: Freedom Scientific, Inc., St. Petersburg, FL (US)

( * ) Notice: Subject to any disclaimer, the term of this patent is extended or adjusted under 35 U.S.C. 154(b) by 1070 days.

(21) Appl. No.: 12/720,090

(22) Filed: Mar. 9, 2010

(65) Prior Publication Data

US 2011/0225544 A1 Sep. 15, 2011

(51) Int. Cl.
*G06F 3/048* (2013.01)
*G06F 3/0481* (2013.01)
*G09G 3/20* (2006.01)

(52) U.S. Cl.
CPC ............ *G06F 3/0481* (2013.01); *G09G 3/20* (2013.01); *G06F 2203/04806* (2013.01); *G09G 2300/026* (2013.01)

(58) Field of Classification Search
CPC ....... G06F 2203/04806; G06F 3/04886; G06F 2203/04803; G09G 5/14; H04N 5/44591
USPC ........................................................ 715/800
See application file for complete search history.

(56) References Cited

U.S. PATENT DOCUMENTS

2005/0204296 A1* 9/2005 Rossler ............ G06F 17/30873
715/751
2006/0050090 A1* 3/2006 Ahmed ................... G09G 5/391
345/660
2010/0283800 A1 11/2010 Cragun et al.

OTHER PUBLICATIONS

Robert Cowart et al., "Microsoft Windows 7 in Depth," Que, Aug. 2009, pp. 95, 777, and 778.*
Wikipedia, "TV tuner card," Nov. 2009, http://en.wikipedia.org/w/index.php?title=TV_tuner_card&oldid=326247491, 4 pages.*
SoftwareTalk, "Overlapping dual monitors," Jan. 2010, 2 pages.*
SourceForge, "Virtual Magnifying Glass 3.3.2," Mar. 2009, 6 pages.*
UK search report dated Jul. 5, 2011 from corresponding application No. GB1104042.5.
Blenkhorn et al. "Screen Magnifiers: Evolution and Evaluation", IEEE Computer Graphics and Applications, 20030901, ISSN 0272-1716; pp. 54-61.

(Continued)

*Primary Examiner* — William Trapanese
(74) *Attorney, Agent, or Firm* — Andriy Lytvyn; Smith & Hopen, P.A.

(57) ABSTRACT

Mechanisms to allow a user to flexibly display visual content on multiple display devices connected to a computer. Each of the multiple displays may be configured to display a portion of visual content from a computer desktop or from an external content source. Each portion of visual content to be outputted may first be enhanced, such as via magnification, before being displayed on one of the multiple display devices. The user may be provided with a first control that enables the user to adjust a portion of visual content displayed on a first display device independently of a portion of visual content displayed on a second display device. A second control may also be provided that enables the user to adjust the portion of visual content displayed on the second display device independently of the portion of visual content displayed on the first display device.

21 Claims, 15 Drawing Sheets

(56) References Cited

OTHER PUBLICATIONS

Ueda et al. "Tenmads: A Software Distributed Multi-display Implementation for Practical and Low-cost Applications", Future Dependable Distributed Systems, 2009 Software Technologies for, 20090317, ISBN 978-0-7695-3572-2; pp. 195-199.
ZoomText 9.1 User'S Guide, $2^{nd}$ ed., Ai Squared, Manchester Center, Vermont, Feb. 2009.

* cited by examiner

FLEXIBLE DISPLAY OF VISUAL CONTENT ON MULTIPLE DISPLAY DEVICES

BACKGROUND

Many modern operating systems executing on a computer provide a virtual area, often called a "desktop," that serves as a user interface into which visual content such as images, icons, menus, or application user interfaces, may be drawn. The desktop, including its drawn visual content, may then be displayed onto one or more display devices connected to the computer. When the computer is connected to a single display device, the entire available desktop area is typically displayed on the display device. When multiple display devices are simultaneously connected to the computer, several modes of displaying the desktop are typically available, thereby providing additional benefits to the user.

In one such mode, often called "clone" mode, as illustrated by FIG. 1A, all connected display devices may display identical content, each displaying the entire available desktop area. In the example of FIG. 1A, the entire computer desktop 102—and thus the identical visual content—is displayed on both display device 104 and display device 106. This "clone" mode may be useful, for example, when the computer is connected to a computer monitor screen as well as to an LCD projector that is used to display a presentation.

Another desktop configuration mode for multiple simultaneously connected display devices, often known as "extended desktop" mode, is illustrated by FIG. 1B. In extended desktop mode, the size of the available desktop area is increased to account for the increase in display area due to the multiple display devices. FIG. 1B illustrates an example in which the two display devices 104 and 106 are of the same size. In the example of FIG. 1B, computer desktop 102 has been configured to be in extended desktop mode, and therefore has been extended to be twice the size. A first half 102a of computer desktop 102 is being displayed on display device 104, while a second half 102b of computer desktop 102 is being displayed on display device 106. Extended desktop mode therefore provides a user with a greater visual area for displaying such content as icons, menus and application user interfaces.

A typical computer desktop may be of limited use, however, to visually impaired users, who may not be able to adequately perceive content as it is typically displayed onto a display device. Accordingly, some users use Accessibility Technology (AT) software applications, such as Zoom-Text™ 9.1 Magnifier/Reader, developed by Ai Squared, Inc., of Manchester Center, Vermont, that facilitates visually impaired users' use of computers. For example, such AT applications can apply enhancements, such as color enhancements, highlighting, magnification, or other enhancements, to a computer desktop to help a visually impaired user to more easily perceive displayed content. In one mode of operation, as illustrated by FIGS. 2A and 2B, an AT software application may magnify a portion (also referred to as a "viewport") of a computer desktop 202. The viewport 206, rather than the full desktop area of desktop 202, is then displayed on a display device 204. In the example of FIG. 2A, although the viewport 206 is only a portion of the full area of desktop 202, it occupies the full display area of display device 204, thereby allowing for magnification of the content in the viewport.

The boundaries defining the viewport may be adjusted, thereby allowing a user to move a viewport to magnify or otherwise enhance a different portion of the desktop. As can be seen by FIG. 2B, viewport 206 has been moved to a different portion of desktop 202. The viewport may be moved, for example, when a user causes the mouse cursor to move to the edge of the current viewport boundary, which is taken as an indication that the user desires the viewport to be moved to display visual content beyond that edge boundary. Accordingly, display device 204 shows a magnified view of the different portion of desktop 202, rather than the portion defined by the position of viewport 206 in FIG. 2A.

Some AT software, including ZoomText™ 9.1 Magnifier/Reader, includes support for multiple display devices connected to the computer. When configured to use multiple display devices simultaneously, such AT software can operate in a variety of modes. FIG. 3 illustrates a first mode of operation, sometimes called "clone" mode. In the example of FIG. 3, rather than display the full desktop area of desktop 302 on display devices 304 and 306, the same viewport 308 (magnified appropriately) is displayed on both display devices 304 and 306. Thus, display devices 304 and 306 each displays the identical visual content. FIG. 4 illustrates a second mode of operation in which a magnified portion (i.e., viewport 408) of desktop 402 is displayed on display device 404, while the full desktop area of desktop 402 is displayed without magnification on display device 406.

FIGS. 5A and 5B illustrate a third mode of operation, sometimes called "span view" mode, for displaying a viewport onto multiple display devices. In "span view" mode, a different viewport of the desktop is created for each display device connected to the computer; however, the viewports have the same magnification level and are arranged contiguously on the desktop. In span view mode, the viewports remain contiguous even when the position on the desktop of one viewport is moved, thereby effectively providing a larger viewport area than would be available with only one viewport at an identical magnification level. Thus, in the example of FIG. 5A, viewports 508 and 510 have been created within computer desktop 502, and are displayed on display device 504 and 506, respectively. As can be seen from FIG. 5A, viewports 508 and 510 have an identical magnification level and are arranged contiguously, so that that they share a viewport boundary. Thus, desktop 502 can be considered conceptually as having a single viewport, divided into two halves, viewport 508 and 510. FIG. 5B illustrates a scenario in which the user has moved one of viewport 508 and 510 to a different portion of desktop 502. As can be seen by FIG. 5B, when one of viewport 508 and 510 is moved, the other viewport follows, thereby remaining contiguously linked to the viewport that moved.

SUMMARY

The inventors have recognized and appreciated the desirability of improved techniques for flexibly displaying visual content on multiple display devices.

Some embodiments may perform a method of displaying a computer desktop on first and second display devices. The method comprises displaying a first portion of the computer desktop on the first display device and displaying a second portion of the computer desktop on the second display device. The method further comprises providing a first control via which a user may adjust the portion of the computer desktop displayed on the first display device independently of the portion of the computer desktop that is displayed on the second display device and providing a second control via which a user may adjust the portion of the computer desktop displayed on the second display device independently of the portion of the computer desktop that is displayed on the first display device.

Some embodiments may include a computer-readable storage medium comprising computer executable instructions, that, when executed on at least one processor in a computer, perform a method of displaying a computer desktop on first and second display devices. The method comprises displaying a first portion of the computer desktop on the first display device and displaying a second portion of the computer desktop on the second display device. The method further comprises adjusting the portion of the computer desktop displayed on the first display device independently of the portion of the computer desktop that is displayed on the second display device and adjusting the portion of the computer desktop displayed on the second display device independently of the portion of the computer desktop that is displayed on the first display device.

Some embodiments may relate to a system comprising a computer comprising at least one processor. The computer may be configured with machine-readable instructions that, when executed on at least one processor, perform a method of displaying visual content on first and second display devices. The method comprises displaying a first magnified portion of the visual content on the first display device and displaying a second magnified portion of the visual content on the second display device. The method further comprises adjusting the magnified portion of the visual content displayed on the first display device independently of the magnified portion of the visual content that is displayed on the second display device and adjusting the magnified portion of the visual desktop displayed on the second display device independently of the magnified portion of the visual content that is displayed on the first display device.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated that the aspects of Accessibility Technology (AT) software that support multiple display devices have shortcomings. In particular, the inventors have recognized that multiple viewports cannot be moved to magnify a different portion of a computer desktop independently from one another. Thus, it is currently difficult according to prior art approaches for a user to magnify separate portions of visual content, such as portions of visual content that correspond to different applications on a computer desktop. For example, a user may wish to view magnified details of an email application in a first viewport and magnified details of a word processing application in a second viewport. As the user is working, the user may wish to move the first viewport to show a different detail of the email application while not changing the display of the magnified details of the word processing application, which is not possible according to prior art techniques.

The inventors have also recognized that the magnification level for each viewport on a system cannot be separately controlled; that is, multiple viewports on a system cannot be configured to have varying magnification levels. Using the same example as above, it is therefore not possible to magnify an email application at a first magnification level and a word processing application at a second magnification level. It may also be useful to display viewports with different magnification levels in order to provide multiple users having varying degrees of visual impairment with a magnified view of visual content that is appropriate to each user. However, in the prior art, different magnification levels for different viewports may not be supported (besides one viewport being configured for magnification and another viewport being configured for no magnification at all).

Accordingly, some embodiments are directed to a technique by which multiple viewports may be configured for a computer desktop, in which each viewport can be configured to be displayed on a display device and moved independently of the other viewport(s) configured for the computer desktop. In some embodiments, the magnification level of each viewport may be independently adjusted without affecting the magnification level of the other viewport(s).

It should be appreciated that, while some embodiments address the shortcomings of the prior art discussed above, not every embodiment addresses these shortcomings. In particular, some embodiments may only address some of these shortcomings, and some embodiments may not address any of the above-discussed shortcomings of the prior art, as the invention is not limited to addressing all or any of the above-discussed shortcomings.

Figure 1A:
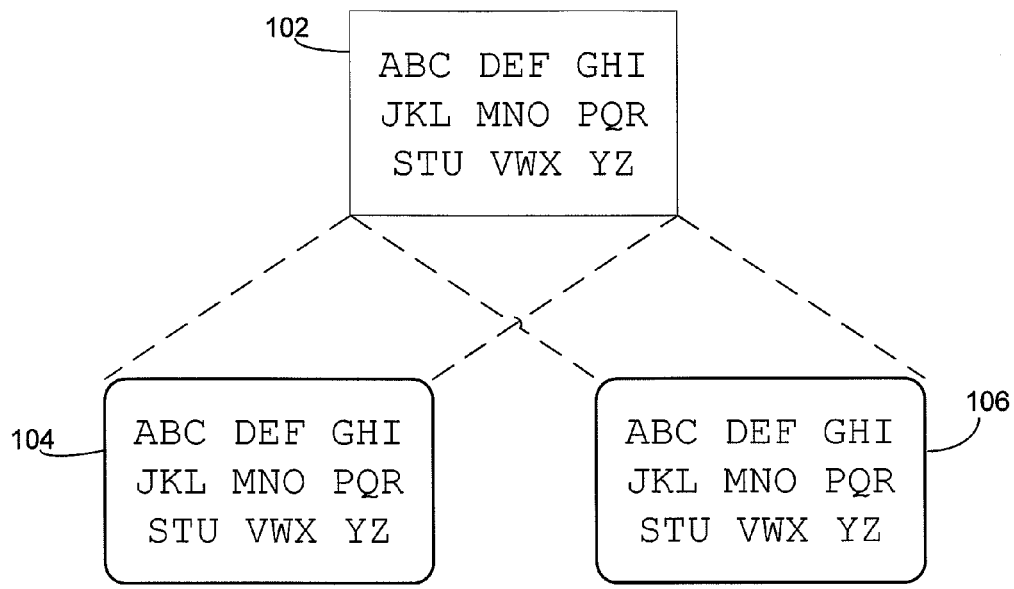
FIG. 1A is a diagram of a computer desktop display displayed on two display devices in clone mode.
Figure 1B:
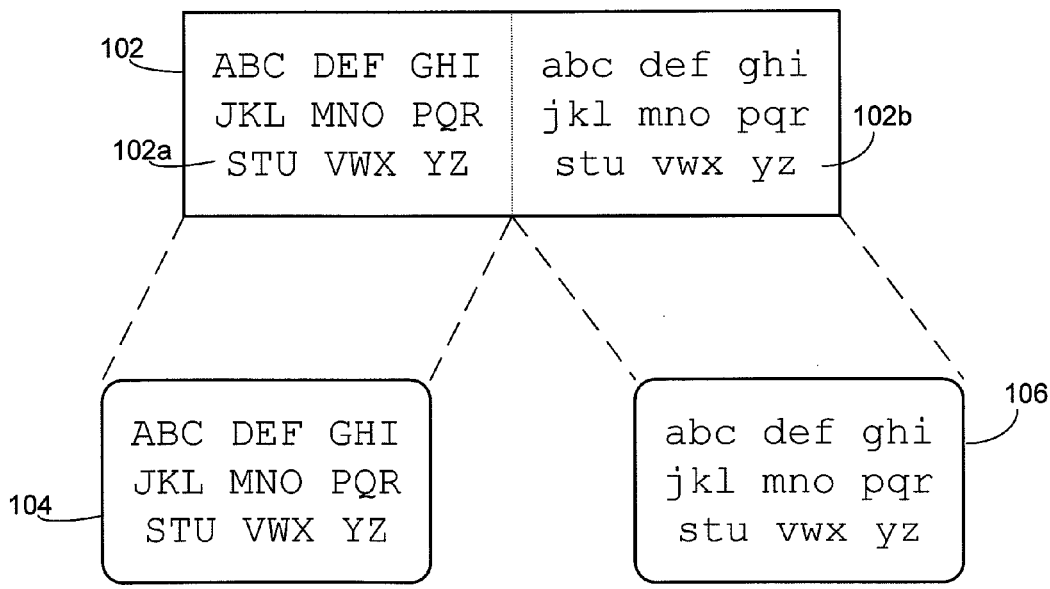
FIG. 1B is a diagram of a computer desktop display displayed on two display devices in extended desktop mode.
Figure 2A:
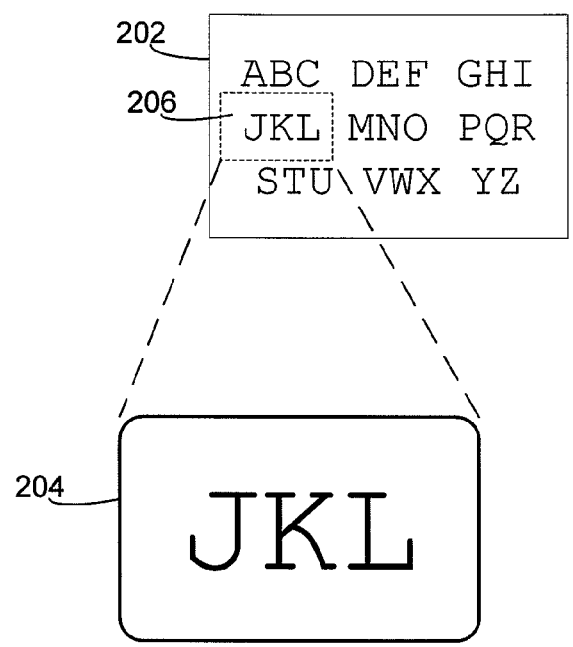
FIG. 2A is a diagram of a computer desktop display in which a magnified viewport of a first portion of the computer desktop is displayed on a single display device.
Figure 2B:
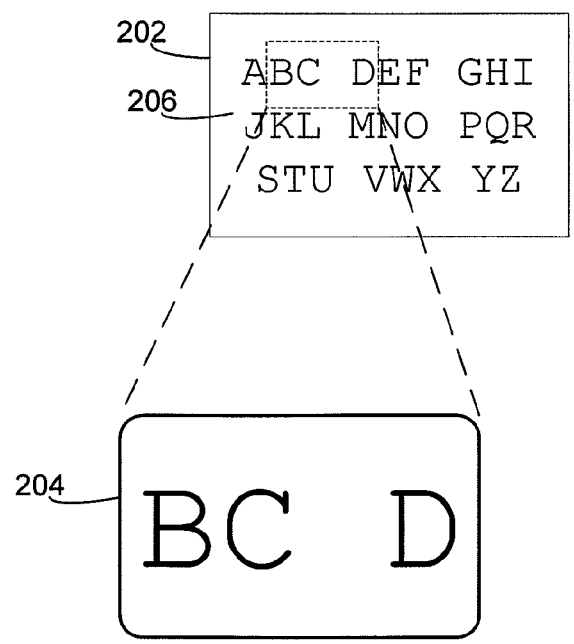
FIG. 2B is a diagram of a computer desktop display in which a magnified viewport of a second portion of the computer desktop is displayed on a single display device.
Figure 3:
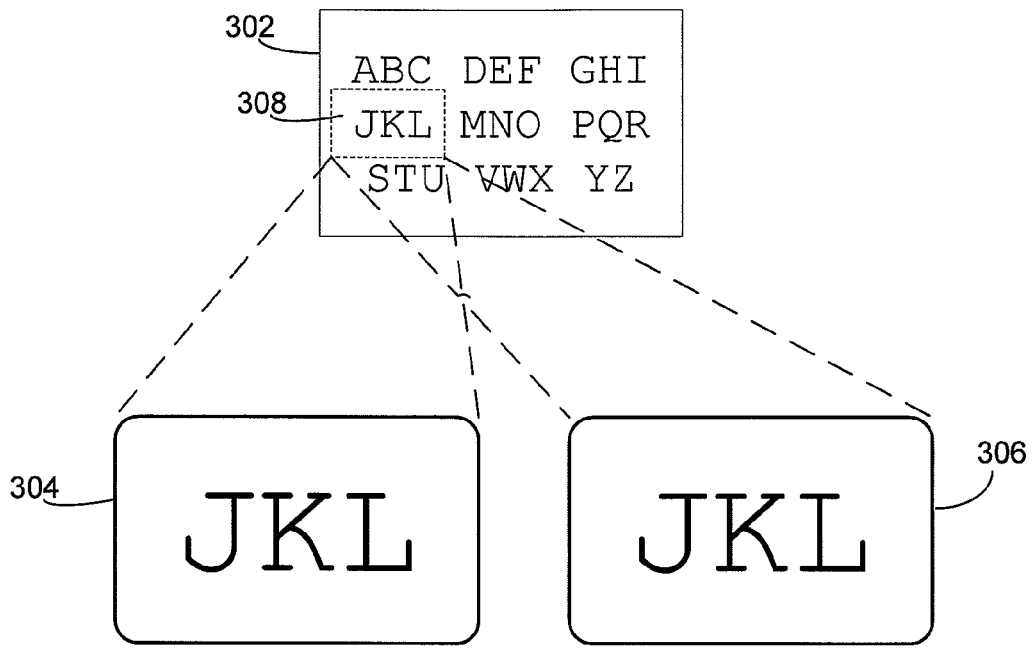
FIG. 3 is a diagram of a computer desktop display in which a magnified viewport of the computer desktop is displayed on two display devices in clone mode.
Figure 4:
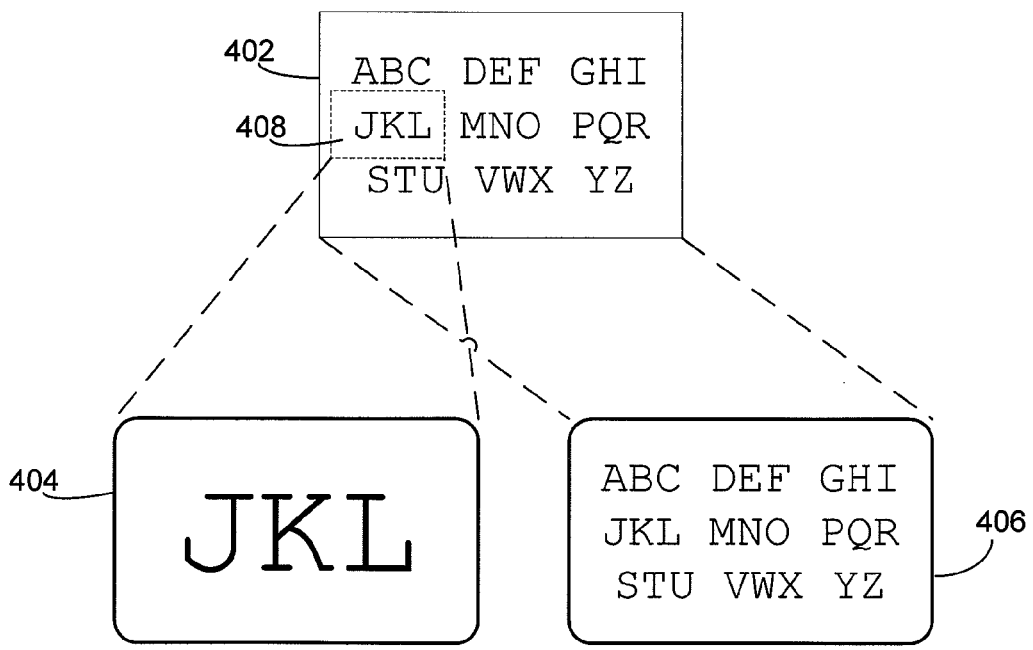
FIG. 4 is a diagram of a computer desktop display in which a magnified viewport of the computer desktop is displayed on a first display device and the unmagnified desktop is displayed on a second display device.
Figure 5A:
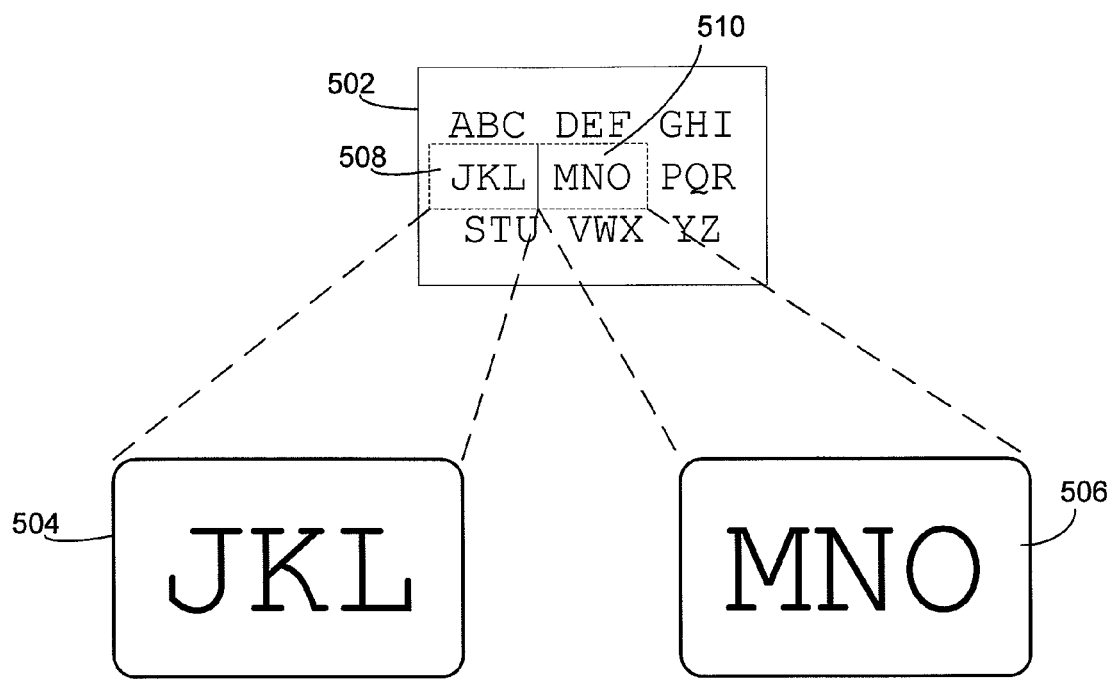
FIG. 5A is a diagram of a computer desktop display in which two viewports of two first portions of the computer desktop are each displayed on one of two display devices in span view mode.
Figure 5B:
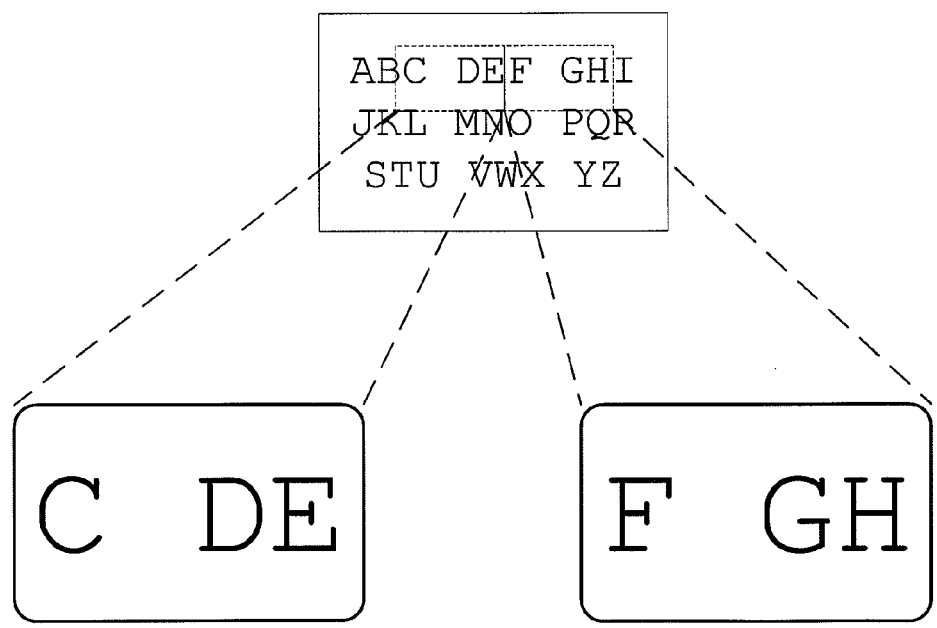
FIG. 5B is a diagram of a computer desktop display in which two viewports of two second portions of the computer desktop are each displayed on one of two display devices in span view mode.
Figure 6:
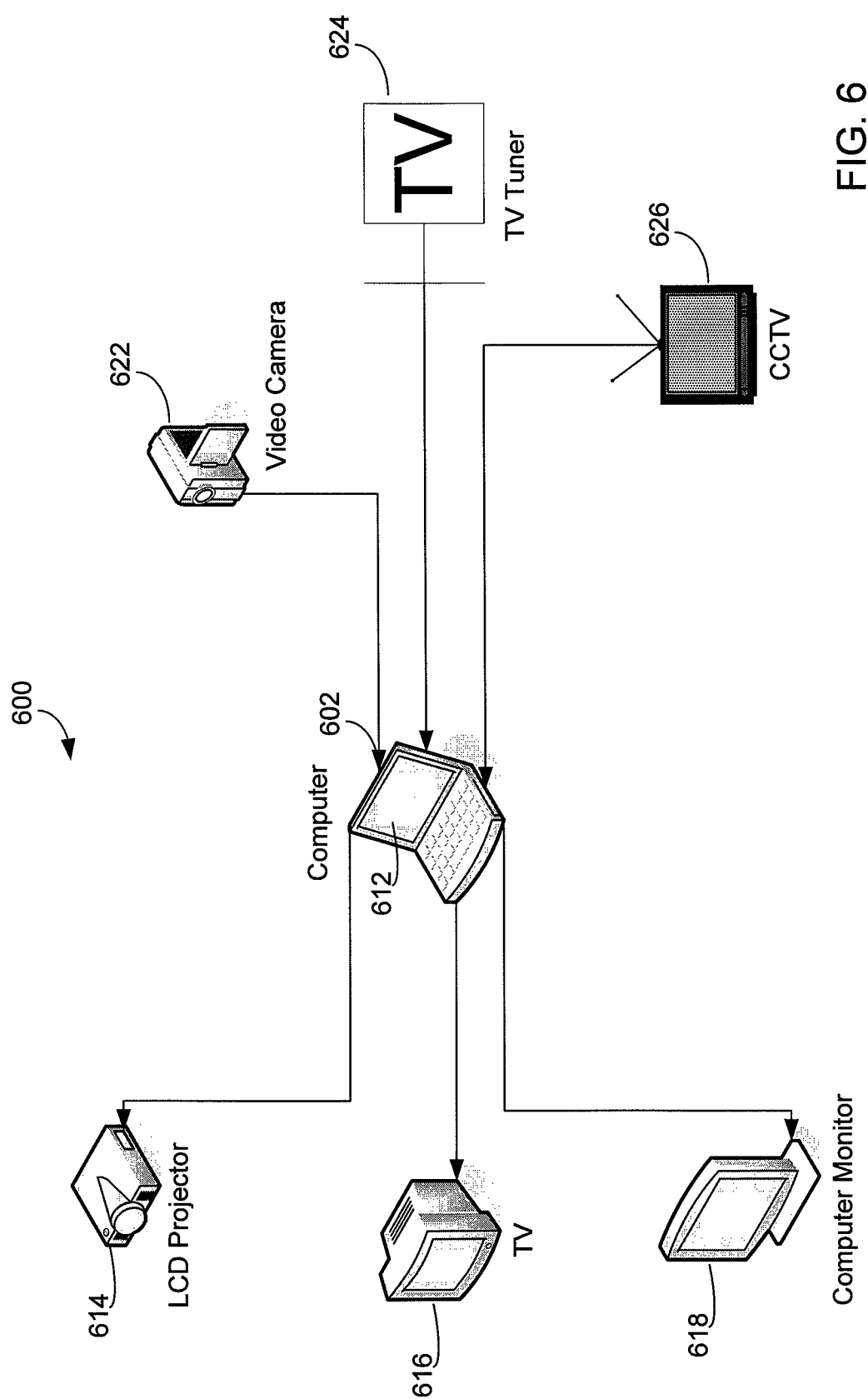
FIG. 6 is a high-level architectural diagram of an environment in which some embodiments may be practiced.

FIG. 6 is a high-level architectural diagram of an environment 600 in which some embodiments may be practiced. FIG. 6 includes a computer 602. While computer 602 is illustrated as a laptop or notebook computer, it may be any suitable computing device capable of being connected to multiple display devices. For example, computer 602 could be a desktop computer, server computer, smart-phone, PDA, thin client, or "dumb terminal."

Computer 602 may be connected to multiple display devices. In the example of FIG. 6, computer 602 is illustrated as being connected to integrated display 612, LCD projector 614, television (TV) 616, and computer monitor 618, although the computer 602 may be connected to any suitable plurality and type of display device. The multiple display devices may be external to (e.g., in a different enclosure as) computer 602 (such as LCD projector 614, TV 616 and computer monitor 618), or they may be integrated in a same enclosure as the computer 602 (such as integrated display 612), or in any combination thereof. Computer 602 may connect to the multiple display devices in any suitable way, including via a graphics interface or via a wired or wireless computer networking medium.

Computer 602 may display visual content from a computer desktop for computer 602 or any portion thereof onto one or more of the multiple display devices. Computer 602 may also be connected to one or more external sources of visual content, such as video camera 622, TV tuner 624, or closed caption television (CCTV) 626. Besides displaying content from its computer desktop onto the multiple display devices, computer 602 may alternatively or additionally display content from one or more of these external sources or any portion thereof onto one or more of the multiple display devices.

Before being displayed onto one of the multiple display devices, the content from the computer desktop or an external source may be enhanced. For example, color enhancements, magnification, and/or highlighting may be applied to the content. Different types of enhancements may be applied to visual content (whether obtained from the computer desktop or from an external source) displayed on different display devices. For example, two display devices could each provide a different level of magnification of the same visual content.

A description of techniques for displaying enhanced content on a single display device is provided below. Following this description, an explanation of how they will be used in multiple display devices is provided.

Figure 7:
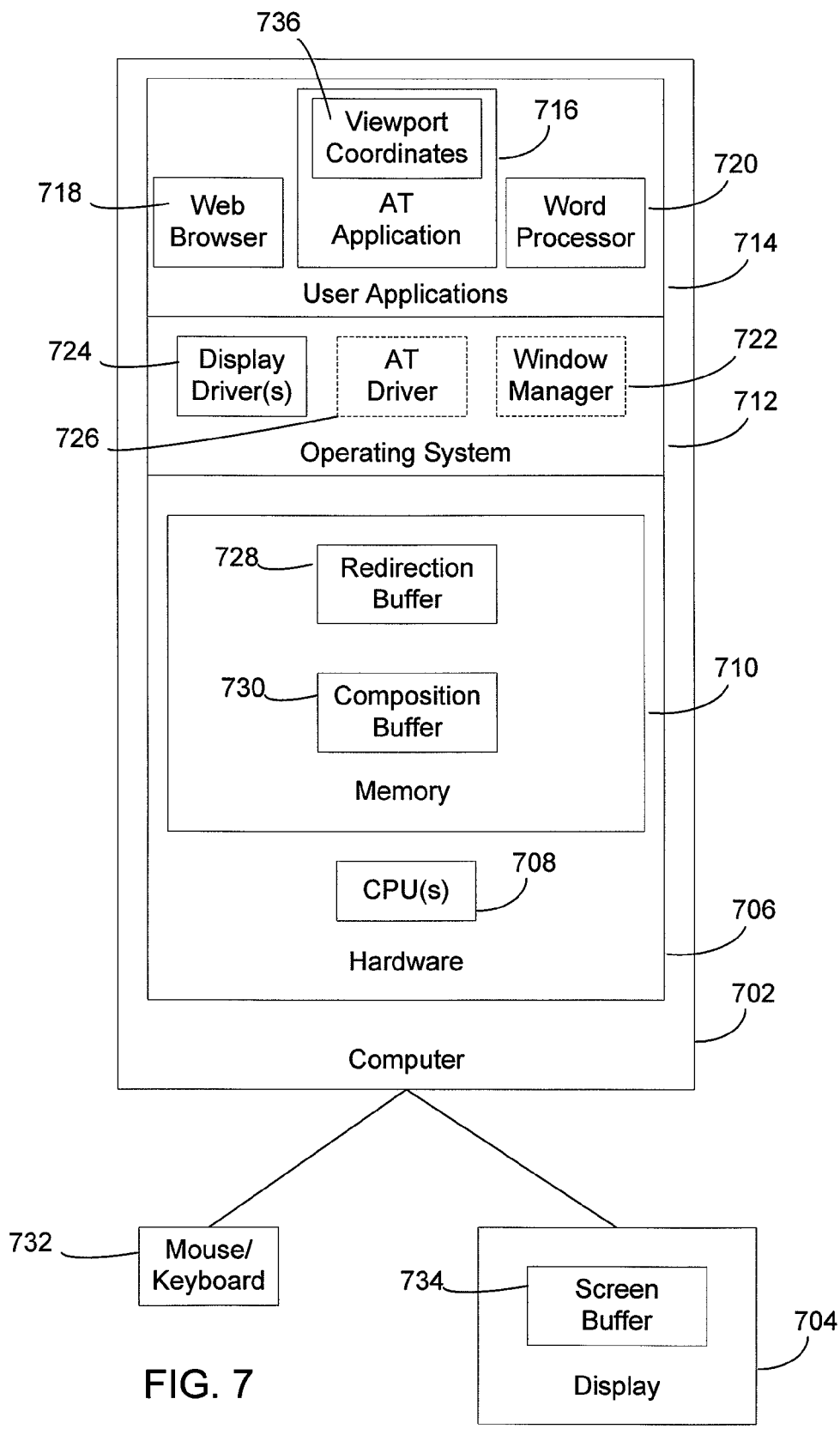
FIG. 7 is a block diagram of a computer, connected to a single display device, that may be configured to enhance a portion of visual content to be displayed on the display device.

While the description that follows in connection with FIG. 7 is in the context of providing enhancements to multiple viewports of a computer desktop, it should be appreciated that similar techniques as those described below could also be applied to enhance multiple viewports of content originating from an external source, such as, for example, a television signal. In addition, some embodiments may support simultaneously enhancing one or more viewports of a computer desktop and enhancing one or more viewports of content originating from one or more external sources.

Accordingly, FIG. 7 is a block diagram of a computer 702, coupled to a single display device 704, that may be configured to enhance a portion of visual content for display on display device 704. Computer 702 may be any suitable type of computer, such as that described in connection with computer 602 of FIG. 6. Similarly, display device 704 may be any suitable display device, such as those described in connection the display devices (i.e., elements 612, 614, 616 and 618) of FIG. 6.

Computer 702 may be implemented using any suitable combination of hardware and software. In the example of FIG. 7, computer 702 includes hardware 706, such as one or more CPU(s) 708 and computer memory 710. CPU(s) 708 may be of any suitable number and instruction architecture, including, for example, RISC, CISC, ARM, or Atom. Computer memory 710 may be any suitable type of tangible volatile or non-volatile data storage, including RAM, ROM, flash memory, hard disk, magnetic disk, optical disk, another type of tangible data storage medium, or any suitable combination thereof.

Computer 702 may also be loaded with software, such as operating system 712 and user applications 714. While the operating system 712 and the user applications 714 are illustrated as being separate from computer memory 710, they may be stored in any suitable executable form in computer memory 710, and may be stored in different types of memory depending on their current execution state.

Operating system 712 may execute on the hardware 706, and may be any suitable operating system, such as a variant of Microsoft Windows™, Mac OS X, Linux, UNIX, and operating systems intended for mobile or embedded devices, or any other suitable operating system. User Applications 714 may execute on hardware 706 through interfaces provided by operating system 712. Applications 714 may include an Accessibility Technologies (AT) application 716, and any suitable other types of user applications, such as, for example, web browser 718 and word processor 720. Of course, the embodiments described herein do not require that other applications, such as a web browser and word processor, be present.

Included in operating system 712 may be a window manager 722, which may manage the composition and rendering of windows on a computer desktop. Window manager 722 may be implemented in any suitable way and may execute in either kernel or user space. Operating system 712 may also include one or more display driver(s) 724 corresponding to the display device 704. Computer 702 may also include an AT driver 726, which may operate in connection with the AT application to provide enhancements in a viewport displayed on the display device. While AT driver 726 is illustrated as a component of operating system 712, in some embodiments, AT driver 726 may be installed separately from the operating system, but may execute in kernel address space with other operating system components. Window manager 722 and AT driver 726 are illustrated as having dashed borders to signify that they may not be included in some embodiments, depending on the specific technique of performing viewport enhancements.

FIG. 7 illustrates two buffers, redirection buffer 728 and composition buffer 730, that have been allocated from computer memory 710. While these are illustrated as being separate memory buffers, some embodiments may use a single buffer in the place of redirection buffer 728 and composition buffer 730. Redirection buffer 728 and composition buffer 730 may be accessible from either or both of kernel address space and a user address space. They may also be accessible from components of operating system 712, a user application (e.g., AT application 716), or any combination thereof.

Connected to the computer 702 may also be one or more input device(s) 732, which may be any suitable input device, such as a mouse, keyboard, stylus, microphone, pointing device, or touch screen, or any suitable combination thereof. Input device(s) 732 may be integrated in the same enclosure as computer 702 or may be external to but otherwise coupled to the computer 702 (e.g., via a wired or wireless connection).

Display device 704 may also include a memory buffer internal to the display device, illustrated in FIG. 7 as screen buffer 734. The screen buffer (also sometimes referred to as a "frame buffer") may be accessible (e.g., through memory mapping) to components in operating system 712 or to a user application, such as AT application 716. The contents stored in screen buffer 734 may correspond to the actual contents displayed on display device 704.

The computer 702 may be configured to enhance a viewport of the computer desktop, such as by performing magnification of that viewport, and to display the enhanced viewport on display device 704. Accordingly, AT application 716 may include viewport settings 736. The viewport settings 736 may include, for example, current viewport coordinates that define the current viewport boundary, current magnification level of the viewport, and other viewport enhancement settings.

When visual content is not being enhanced by AT software, such as AT application 716 and/or AT driver 726, an application, such as one of user applications 714, desiring to display visual content on display device 704 may typically do so using an interface provided by operating system 712. Upon receiving the instruction through the interface to display visual content, depending on the specific operating system configuration, the operating system 712 may in some configurations copy the visual content directly to screen buffer 734, thereby displaying the content on the display device 704. In other operating system configurations, upon receiving the instruction through the interface, the operating system 712 may first write the visual content in a buffer, sometimes known as a "back buffer." A component, such as window manager 722, of operating system 712, may perform transformations on the visual content in the back buffer, such as applying translucent or transparent effects, and then copy the data from the back buffer to screen buffer 734, which allows display device 704 to display the visual content.

According to some embodiments, when AT software is configured to enhance a portion of visual content before displaying that enhanced visual content on display device 704, the portion of the visual content may first be enhanced by the AT software before the operating system copies the content to the back buffer or screen buffer 734. In some embodiments, upon receiving through the interface the instruction to display visual content from one of user applications 714, the operating system 712 may be caused to copy the visual content to redirection buffer 728 rather than to the back buffer or to screen buffer 734.

In some embodiments, the AT software may then copy the portion of the visual content that is configured to be enhanced from redirection buffer 728 to composition buffer 730. The visual content in composition buffer 730 may then be enhanced, such as, for example, through magnification. Visual content from redirection buffer 728 may be copied to composition buffer 730 and enhanced at periodic intervals or as the result of a notification that visual content in redirection buffer 728 has changed. However, it should be appreciated that in some embodiments, rather than perform enhancements to visual content in composition buffer 728 after it has been copied, enhancements may alternatively and/or additionally be performed during the copy operation itself from redirection buffer 728 to composition buffer 730. For example, magnification may be performed during the copy step by repeating rows and columns of the original visual content in correspondence to the current magnification level.

Moreover, it should be appreciated that some embodiments may not use a separate redirection buffer and composition buffer. For example, in some embodiments, the visual content may be enhanced directly in redirection buffer 728 or in screen buffer 734. The actual enhancement processing may be carried out in any suitable way, including by any suitable combination of hardware or software. In some embodiments, the enhancement may be performed by AT driver 726 and/or AT application 716. The enhancement may alternatively or additionally be performed in dedicated hardware, such as in a graphics processing unit in hardware 706. Such dedicated graphics processing hardware may be accessible to computer 702 in any suitable way. For example, the dedicated hardware may be integrated on a system board of computer 702 (e.g., "motherboard") or it may be on a separate circuit board such as a graphics adapter card that is electrically coupled to the system board.

Regardless of the specific manner in which the enhancement processing is performed, the AT software may instruct operating system 702 to copy the enhanced visual content in composition buffer 730 to screen buffer 734 for display onto display device 704. This may be done in any suitable way. For example, in some embodiments, the AT software may issue a function call to display driver 724 to have it copy the visual content from composition buffer 730 to screen buffer 734. In other embodiments, composition buffer 730 may actually be the "back buffer," discussed above. In such embodiments, the AT software may issue an instruction through an interface with a component of operating system 712, such as window manager 722, to inform it that the visual content is to be displayed on display device 704. In some embodiments, window manager 722 may then optionally apply transformations (e.g., transparency effects, etc.) to the visual content in composition buffer 730 (which may also be the back buffer). While in the discussion above, the AT software is described as performing enhancements on the visual content prior to any optional transformations are applied by window manager 722, it should be appreciated that window manager 722 may apply transformations to the visual content in composition buffer 730 either before or after the AT software enhances the content in the composition buffer 730. After any enhancements and optional transformations have been performed, window manager 722 may then copy the contents of composition buffer 730 to screen buffer 734 to allow the visual content to be displayed on display device 734.

Some specific implementations of performing the above-discussed redirection will now be described. In a first implementation, sometimes referred to as driver chaining or driver interception, AT driver 726 may insert itself in a driver stack of operating system 712 above display driver(s) 724, so that display driver calls intended to be received and processed by display driver(s) 724 are effectively intercepted by AT driver 726. The driver interception may be performed in any suitable way. For example, driver entry points in a table of function pointers for display driver(s) 724 may be modified to point to functions in AT driver 726. Some operating systems such as variants of Microsoft Windows may provide an API to register a driver as part of a display driver chain.

Upon intercepting a driver call, AT driver 726 may perform some initial processing. For example, AT driver 726 may replace a value for a pointer variable (sometimes referred to as a "surface pointer") that is expected to point to screen buffer 734 to instead point to redirection buffer 728. At least for some intercepted calls, AT driver 726 may perform some initial processing and then make the appropriate driver call in underlying display driver(s) 724. Such underlying driver calls may be made with modified actual function parameters. For example, a parameter value for the surface pointer may be modified to point to redirection buffer 728. This has the effect of causing visual content to be written to redirection buffer 728 rather than being written directly to screen buffer 734. AT software, whether AT driver 726 or AT application 716, may then copy the appropriate portion of visual content that will be enhanced from redirection buffer 728 to composition buffer 730. The visual content in composition buffer 730 may then be enhanced, as discussed above. After the enhancement processing, a driver call, such as DrvCopyBits( ) in variants of the Windows operating system, or other driver calls in other operating systems, may be made to display driver(s) 724 to instruct it to copy visual content from composition buffer 730 to screen buffer 734. This driver call may be made in any suitable way. In some embodiments, AT application 716 may issue a "driver escape" to allow it to issue the appropriate call into display driver(s) 724.

A second possible implementation may be used in operating systems (e.g., variants of Microsoft Windows) that support a capability sometimes called "layered windows." When an operating system provides layered windows capability, visual content is first drawn to a redirection buffer that is configured by the operating system or supplied by an application, thereby allowing the operating system to provide effects such as transparency to be applied across different application windows before the operating system causes visual content to be displayed on display device 704. Thus, in these embodiments, an application (e.g., one of user applications 714) or operating system 712 may itself create redirection buffer 728.

In some embodiments, AT software may create a new layered window (referred to hereafter as "AT layered window") to represent the enhanced visual content that may be displayed on display device 704. The AT layered window may be configured to be the top window and to occupy the full area of the display. In operating systems that provide a capability to control the opacity of layered windows, the AT layered window may be configured to be fully opaque. Thus, in some embodiments, the visual content of layered or non-layered windows corresponding to windows of user applications 714 or windows of components of operating system 712 are drawn in redirection buffer 728; however, typically, the AT layered window may not contain any content until the AT software has drawn (and possibly enhanced) visual content into the AT layered window.

In some embodiments, AT software may query operating system 712 for the contents of redirection buffer 728. This may be done in any suitable way. For example, it may be done at fixed intervals and/or as the result of a notification that the content in redirection buffer 728 has changed. In some embodiments, AT application 716 may issue a call to operating system 712 through a published API provided by operating system 712 to retrieve the contents of the redirection buffer with the exception of the contents of the AT layered window. Thus, AT application 716 may obtain through the published API visual content for the portion of redirection buffer 728 that corresponds to viewport settings 736, and may copy such visual content to composition buffer 730. AT software may then enhance the visual content in composition buffer 730 in any suitable way, as discussed above.

After the visual content in composition buffer 730 has been enhanced, the AT software may notify operating system 712 to copy the contents of composition buffer 730 to screen buffer 734. This may be done in any suitable way. In some embodiments, AT application 716 may issue a call to operating system 712 to invalidate the AT layered window. This may cause operating system 712 to send a "paint message," which allows the AT software to draw the contents of composition buffer 730 into the AT layered window, thereby allowing operating system 712 to copy the contents of the AT layered window to screen buffer 734 and display them on display device 704. Alternatively, some operating systems may provide an API to copy a buffer for a layered window, thereby allowing AT software to copy the contents of composition buffer 730 into the AT layered window. As a third alternative, some operating systems may support associating the AT layered window with a hardware acceleration technology, such as DirectX. If the AT layered window is initialized to use a hardware acceleration technology (DirectX, for example), the AT software may call a DirectX routine to write composition buffer 730 to the AT layered window. DirectX may then, through hardware assistance, copy the contents of the AT layered window to screen buffer 734 for display onto display device 704.

A third possible implementation may be used in operating systems that provide a window manager, such as window manager 722, that may act as a composition engine (e.g., applying special effects, translucency, transparency, etc.) for multiple windows to be displayed on a display device. Examples of such a window manager may be the Desktop Window Manager included in variants of Microsoft Windows and the Quartz Compositor included in variants of Mac OS X.

According to this third implementation, calls are made (such as by user applications 714) to window manager 722 when visual content to be displayed needs to be updated for the caller. It should be appreciated that such calls from a user application to window manager 722 may be indirect. For example, in some embodiments a user application (such as one of user applications 714) may issue a call to the kernel of operating system 712 to request visual content to be displayed. The kernel may then send a notification to a user mode service, which may then send a notification to window manager 722.

Regardless of whether a user application calls window manager 722 directly or indirectly, when AT software is not configured to enhance visual content to be displayed, window manager 722 composes such visual content updates to an off-screen surface (e.g., a "back buffer") where window manager 722 may re-compose the visual content, such as applying transparency effects, across various application windows. After re-composing the back buffer, window manager 722 may write the contents of the back buffer to screen buffer 734, thereby allowing display device 704 to display the contents of the screen. This may be done in any suitable way. In some implementations of window manager 722, such as that in variants of the Microsoft Windows operating system, window manager 722 may issue a Present( ) function call provided by a DirectX object in window manager 722, which may "flip" the contents of the back buffer and screen buffer 734 (i.e., the contents of the back buffer may be written to screen buffer 734, and the newly written contents of screen buffer 734 may become the new contents of the back buffer).

When AT software is configured to enhance the visual content to be displayed, however, window manager 722 may be caused to redirect visual content updates to redirection buffer 728 provided by the AT software, rather than to the back buffer, as discussed above. Furthermore, when an application issues the Present( ) function call, rather than immediately executing the typical Present( ) routine implemented by window manager 722, an implementation of Present( ) provided by the AT software may instead be caused to be executed. Execution of the AT software Present( ) routine may result in a copy of any portions of visual content that correspond to the current viewport from redirection buffer 728 to composition buffer 730 and an application of enhancements, such as magnification, to the visual content in composition buffer 730. As discussed above, the application of enhancements may be performed at the time visual content is copied from redirection buffer 728 to composition buffer 730 and/or after the copy is complete. In some embodiments, composition buffer 730 may be the back buffer into which window manager 722 would typically render visual content when the AT software is not configured to enhance the content. The enhancement processing may be performed in any suitable way, as discussed above. In some embodiments, at least some of the enhancement may be performed using hardware acceleration, such as that provided via a DirectX interface. After performing the enhancement processing, the AT software may call the implementation of the Present( ) routine provided by a DirectX object in window manager 722, thereby writing the contents of composition buffer 730 (which, as discussed above, may be the same as the back buffer) into screen buffer 734.

It should be appreciated that while the discussion above describes modifying an implementation of the Present( ) routine provided by a DirectX object in window manager 722, in some embodiments, the implementation of alternative or additional routines may be modified. For example, in some implementations of window manager 722, such as that in variants of the Microsoft Windows operating system, the implementation of the EndScene( ) routine provided by a DirectX object in window manager 722 may alternatively be modified.

Figure 8:
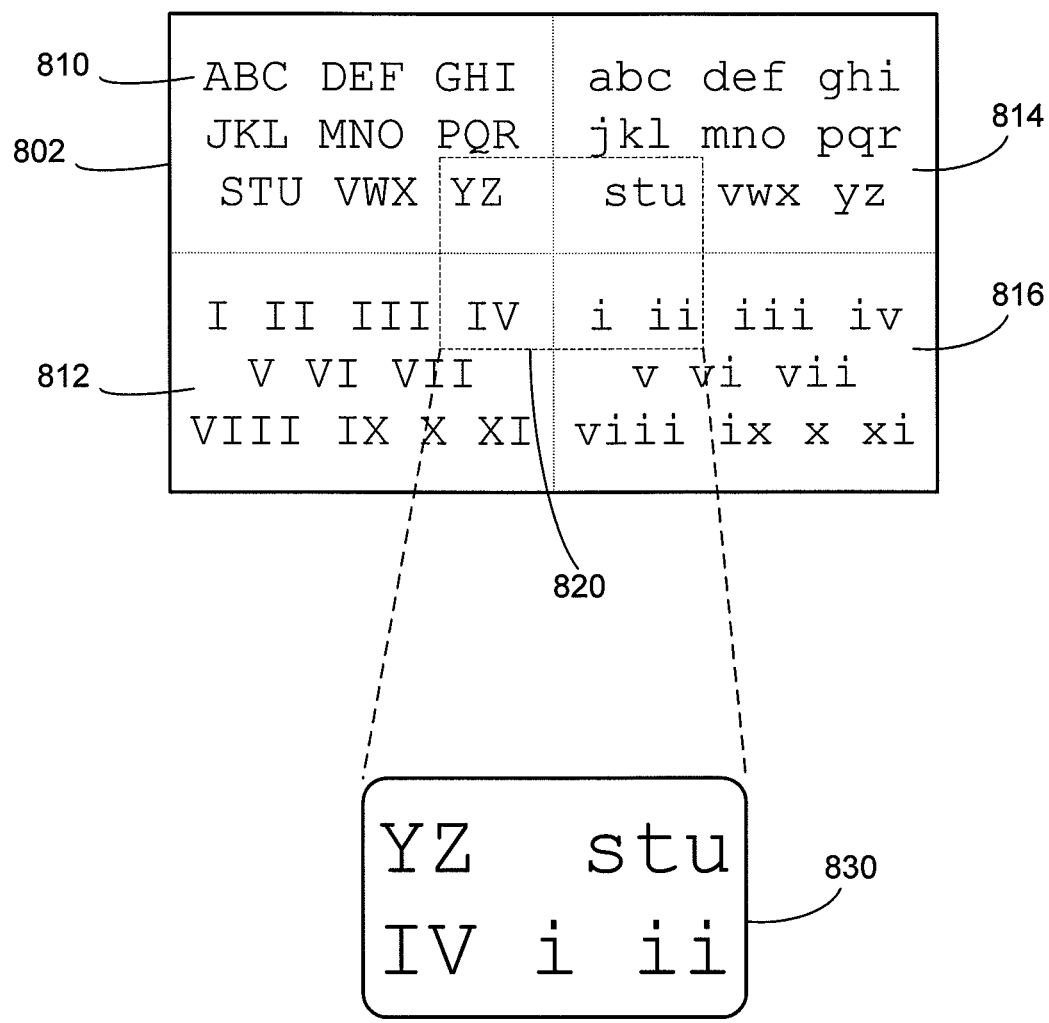
FIG. 8 is a diagram of a portion of an extended desktop being displayed onto a display device.

Regardless of the specific method of implementing enhancement of a viewport of visual content in a computer with a single display device, a viewport may also be configured in a system with multiple display devices. FIG. 8 is a diagram of a portion of an extended desktop being displayed onto a display device. As discussed above, in operating systems that support being simultaneously connected to multiple display devices in extended desktop mode, the computer desktop into which visual content may be drawn may have an area commensurate with the combined display area of the multiple display devices. In the example of FIG. 8, four display devices of equal size, one of which being display device 830, are connected to a computer. The other three display devices are not shown in FIG. 8. Because the computer has been configured with its desktop, computer desktop 802, in "extended" mode, the size of computer desktop 802 has been increased in accordance with the four-fold increase in display area due to the four connected display devices. Thus, computer desktop 802 may be divided into four equal-sized sections, desktop sections 810, 812, 814 and 816, that may each ordinarily be displayed on one of the four connected display devices.

According to some embodiments, the computer may be configured to have a portion of computer desktop 802 be a "viewport" to be enhanced and subsequently displayed onto one of the multiple display devices. In the example of FIG. 8, viewport 820 has been configured from computer desktop 802 to be displayed onto display device 830. It is to be appreciated that while the example of FIG. 8 only depicts one viewport and one display device, according to some embodiments, multiple viewports may be configured for an extended desktop and be displayed on multiple display devices. For example, in some embodiments, the number of viewports may correspond to the number of connected display devices (e.g., four display devices and four viewports, in the example of FIG. 8).

A viewport can include portions of a single desktop section or of multiple desktop sections of computer desktop 802. In the example of FIG. 8, viewport 820 includes portions of desktop sections 810, 812, 816 and 816. In addition, according to some embodiments, a viewport is enhanced before being displayed on a display device. As can be seen in FIG. 8, viewport 820 has been magnified before being displayed on display device 830.

A viewport may be defined in any suitable way. In some embodiments, the entire extended computer desktop may form a continuous two-dimensional or three-dimensional coordinate space. For example, the origin of computer desktop 802 may be at the top left corner of the computer desktop, with horizontal and vertical coordinates for a given position in computer desktop 802 increasing as the position descends and moves to the right, respectively. Thus, in embodiments in which a viewport is a rectangular shape, the boundaries for a viewport may be specified by the coordinate position in the computer desktop space of any two opposite corners of the viewport.

Figure 9:
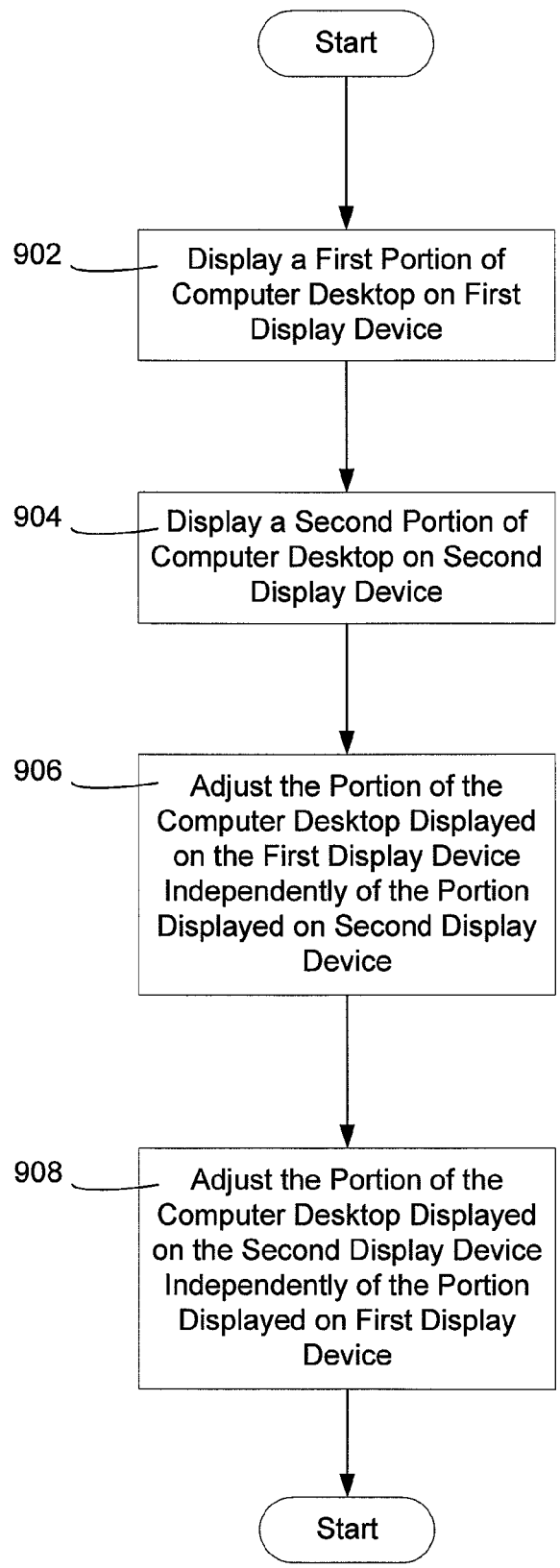
FIG. 9 is a high-level flow chart illustrating a process of adjusting multiple viewports independently in a system that includes multiple display devices, in accordance with some embodiments.

Regardless of the specific manner of specifying the boundaries of a viewport, according to some embodiments, a viewport configuration may be adjusted, including adjusting the viewport boundaries. FIG. 9 is a high-level flow chart illustrating a process of adjusting multiple viewports independently in a system that includes multiple display devices. While the process of FIG. 9 is carried out for a computer that is connected to two display devices and is configured to use two viewports, the process can be carried out for any plurality of viewports and display devices. The process of FIG. 9 may be carried out in any suitable combination of hardware and software.

The process may begin at block 902, at which the computer may display a first portion of the computer desktop on a first display device connected to the computer. The first portion of the computer desktop may be a first viewport, enhanced in any suitable way, including using any of the viewport enhancement techniques discussed in connection with FIG. 7. At block 904, the computer may then display a second portion of the computer desktop on a second display device connected to the computer. The second portion of the computer desktop may be a second viewport, and may be enhanced in any suitable way, including in a similar way as the first portion. The enhancement of the second portion may be according to similar or different enhancement settings as the first portion. It is to be appreciated that steps 902 and 904 could alternatively be performed in reverse order or at the same or approximately the same time.

At block 906, the computer may then adjust the portion of the computer desktop displayed on the first display device independently of the portion of the computer desktop displayed on the second display device. The adjustment may be carried out based on any suitable criteria. For example, the adjustment may be made in response to user input, including the user selection of an adjustment control. The adjustment may additionally or alternatively be made in response to an event initiated from a software application or operating system executing on the computer. Adjusting the portion of the computer desktop displayed on the first display device may involve adjusting viewport settings for the first portion of the computer desktop, such as adjusting viewport coordinates defining viewport boundaries of the first portion of the computer desktop. For example, the computer may be configured to adjust the first portion of the computer desktop when a user utilizes a pointing device such as a mouse to attempt to change the position of the mouse pointer beyond the visible portion of the first display device, such as by moving the mouse pointer to the edge of the first display. Upon detecting that the position of the mouse pointer has moved to an edge of the first display, for example, the computer may be configured to move the first viewport boundaries in the direction of the mouse pointer movement.

Upon adjusting the first portion of the computer desktop, such as by adjusting the coordinates of the first viewport, the visual content in the newly adjusted first portion may be enhanced, and may then be newly displayed on the first display device. However, the act of adjusting the portion of the computer desktop displayed on the first display device may have no effect in and of itself with respect to making any adjustments to the portion of the computer desktop displayed on the second display device. In some embodiments, even as the portion of the computer desktop displayed on the first display device is adjusted, the portion of the computer desktop displayed on the second display device may not be changed. Thus, the portion of the computer desktop displayed on the first display device may be adjusted independently of the portion of the computer desktop displayed on the second display device.

At block 908, the computer may then adjust the portion of the computer desktop displayed on the second display device independently of the portion of the computer desktop displayed on the first display device. This step may be carried out in a similar manner to step 906, discussed above, except that any adjustments to displayed content in step 908 may be made to the portion of the computer desktop displayed on the second display device, while the portion of the computer desktop displayed on the first display device may remain unchanged. It is to be appreciated that steps 906 and 908 need not both be performed, or if they are both performed, they may be performed in reverse order or at the same or approximately the same time.

FIGS. 10A-10G illustrate various examples of situations in which the process of FIG. 9 may be employed. In the examples of FIGS. 10A-10G, a computer is configured in "extended" desktop mode with two connected identically-sized display devices, display devices 1030 and 1032. As discussed above, because the computer is configured in extended desktop mode, its desktop, computer desktop 1002, has an increased area to account for the increased number of display devices. Computer desktop 1002 can be considered to be divided into two sections, desktop sections 1010 and 1012. In a typical extended desktop scenario (i.e., when the AT software is not used to enhance the displayed visual content), desktop sections 1010 and 1012 would be displayed on display devices 1030 and 1032, respectively.

Because a computer desktop is virtual, however, computer desktop 1002 need not all be displayed on display devices 1030 and 1032. In the embodiment illustrated in FIGS. 10A-10G, the computer has been configured, with the aid of AT software, to have two viewports, viewports 1020 and 1022. Thus, rather than display desktop sections 1010 and 1012 on display devices 1030 and 1032, as would typically be done in extended desktop mode, after the visual content in viewports 1020 and 1022 has been enhanced according to some embodiments, the enhanced visual content in viewports 1020 and 1022 may be displayed on display devices 1030 and 1032, respectively.

As discussed above, a viewport may be a configurable portion of a computer desktop that is enhanced before being displayed on a display device. While the example of FIGS. 10A-10G illustrates enhancing visual content in viewports 1020 and 1022 by performing magnification on the visual content, other types of enhancements additionally or alternatively may be performed. For example, in some embodiments, color enhancements or highlighting may be applied to the visual content in viewports 1020 and 1022. In addition, in some embodiments, the type of enhancement to be performed in each viewport may be configurable, such as via user settings, so that different types of enhancement may be performed in different viewports.

Figure 10A:
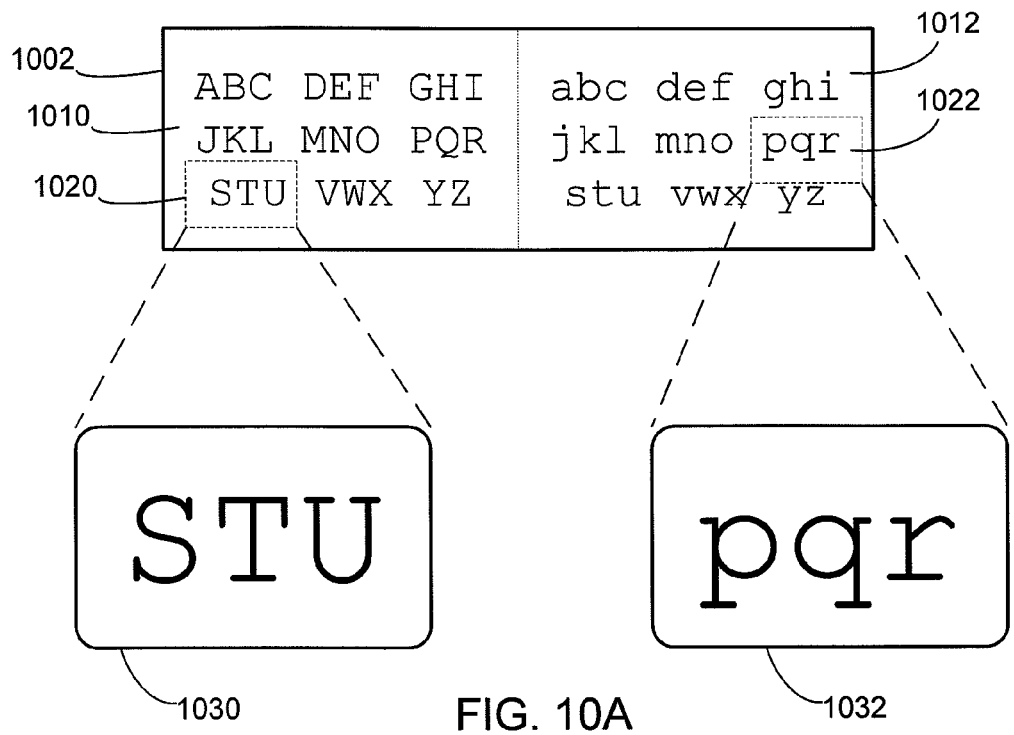
FIG. 10A is a diagram of a computer desktop display in which two viewports in initial positions are each displayed on one of two connected display devices in extended desktop mode.

FIG. 10A shows a configuration in which viewport 1020 is a magnified view of the characters "STU," while viewport 1022 is a magnified view of the characters "pqr." In FIG. 10, each of viewports 1020 and 1022 comprise a different, non-overlapping portion of computer desktop 1002, and are each in a different desktop section. That is, viewport 1020 corresponds to a portion of desktop section 1010 while viewport 1022 corresponds to a portion of desktop section 1012. However, as will be illustrated below, a viewport need not be confined to a particular desktop section.

Figure 10B:
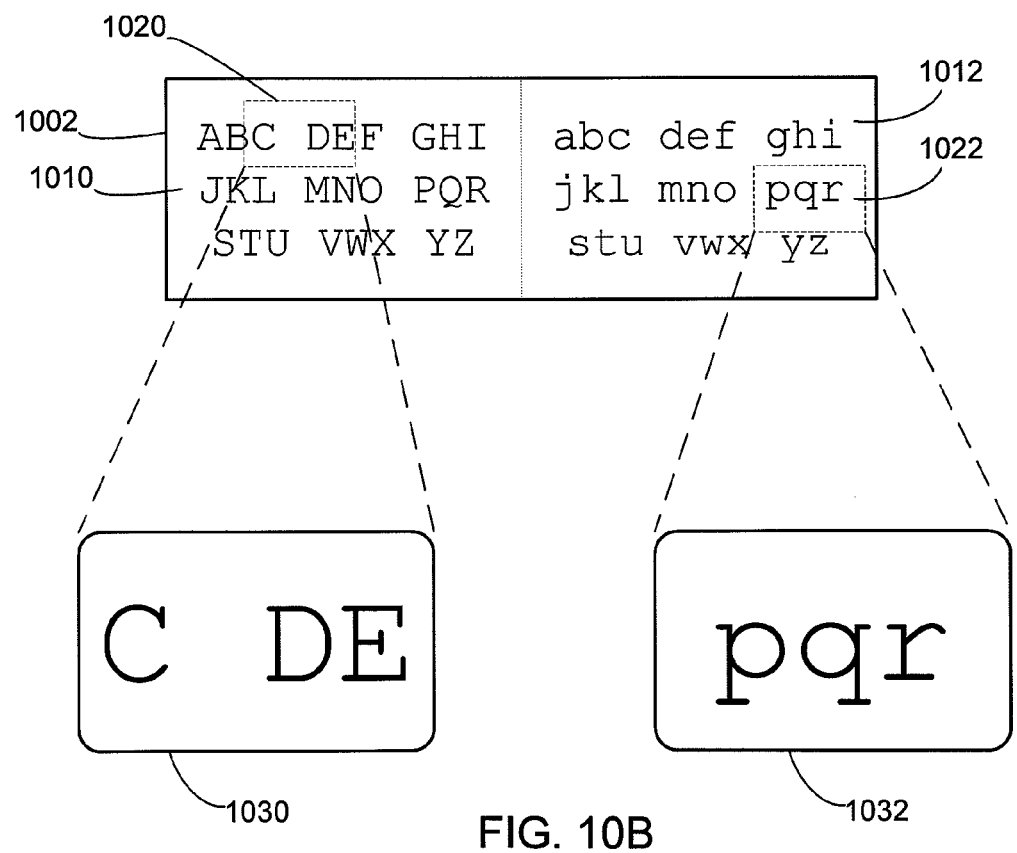
FIG. 10B is a diagram of a computer desktop display in which a first viewport in an adjusted position and a second viewport in an initial position are each displayed on one of two connected display devices in extended desktop mode.

FIG. 10B shows an example of a scenario in which the boundaries of viewport 1020 have been adjusted from those in FIG. 10A so that viewport 1020 now includes a different portion of computer desktop 1002, such as may occur in response to user input. Accordingly, viewport 1020 no longer is a magnified view of the characters "STU," but instead is a magnified view of the characters "C DE" on computer desktop 1002. As can be seen by FIG. 10B, the change in location of viewport 1020 does not affect the location of viewport 1022; rather, viewport 1022 still is a magnified view of the same portion of computer desktop 1002 (i.e., characters "pqr"). Thus, viewport 1020 was adjusted independently of viewport 1022. As is illustrated in FIG. 10B, the current content of viewports 1020 and 1022 is displayed on display devices 1030 and 1032, reflecting the change in content of viewport 1020 as compared to that in FIG. 10A.

Figure 10C:
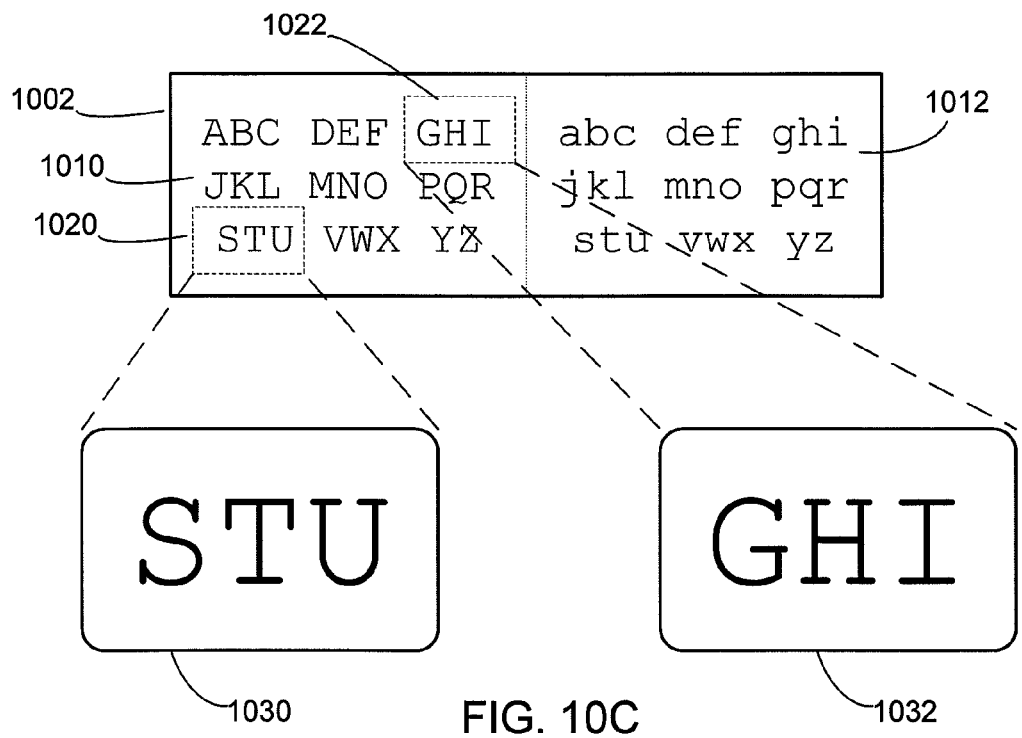
FIG. 10C is a diagram of a computer desktop display in which a first viewport in an initial position and a second viewport in an adjusted position are each displayed on one of two connected display devices in extended desktop mode.

FIG. 10C shows an example of a scenario in which the boundaries of viewport 1022 have been adjusted from those in FIG. 10A so that viewport 1022 now includes a different portion of computer desktop 1002. The example of FIG. 10C illustrates that viewport 1022 can be adjusted independently from viewport 1020, as FIG. 10C shows that viewport 1020 has not been adjusted from its location in FIG. 10A, despite the adjustment of viewport 1022. Accordingly, viewport 1022 is no longer a magnified view of the characters "pqr," but rather, a magnified view of the characters "GHI," while viewport 1020 still is a magnified view of the same portion of computer desktop 1002 (i.e., characters "STU") as in FIG. 10A. Furthermore, as is clear from the example of FIG. 10C, the boundaries of viewport 1022 have been adjusted so that viewport 1022 is no longer in desktop section 1012, but instead corresponds to a portion of desktop section 1010. Thus, it should be appreciated that a viewport may be "moved" across desktop sections. In addition, while two portions of desktop section 1010 are displayed on display devices 1030 and 1032, none of desktop section 1012 is currently being displayed in the example of FIG. 10C. Thus, it can be seen that in some embodiments, a display device is not tied to a particular desktop section, and a portion of each desktop section of computer desktop 1002 need not always be displayed.

Figure 10D:
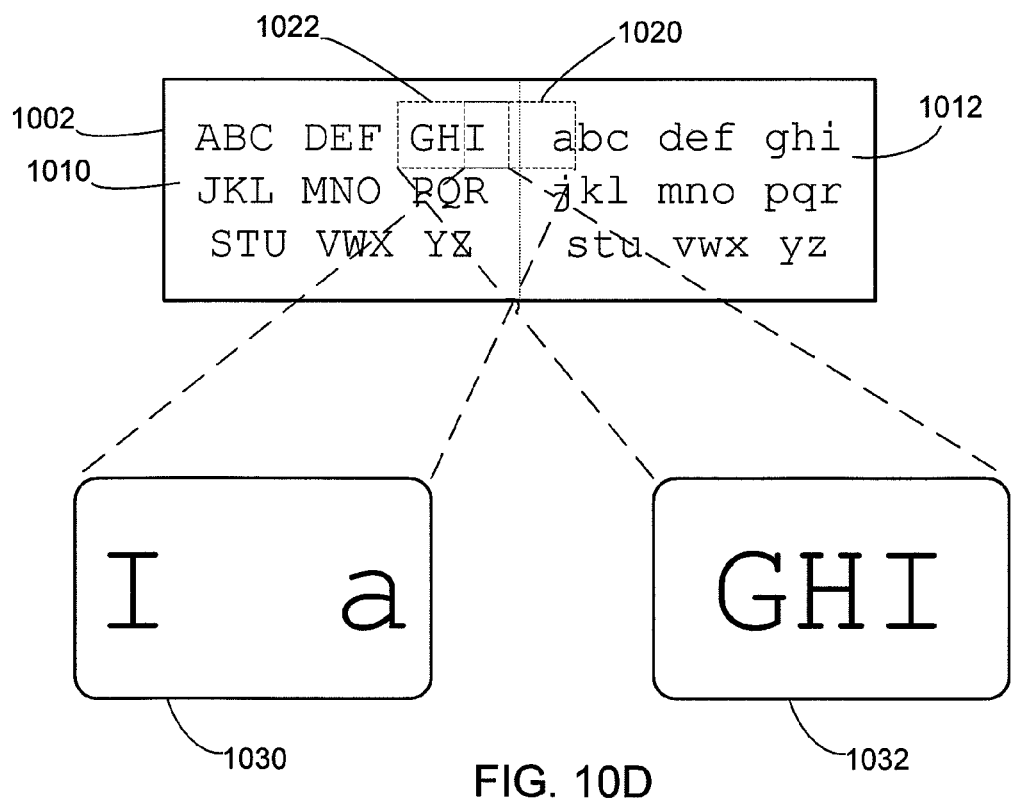
FIG. 10D is a diagram of a computer desktop display in which two viewports in overlapping positions are each displayed on one of two connected display devices in extended desktop mode.

FIG. 10D is a scenario illustrating overlapping viewports. That is, multiple viewports may include at least some of the same portion of computer desktop 1002. In FIG. 10D, viewport 1022 has not been adjusted compared to FIG. 10C, and still is a magnified view of the portion of computer desktop 1002 including the characters, "GHI." Viewport 1020, however, has been adjusted to now be a magnified view of the portion of computer desktop 1002 that includes the characters, "I a." Thus, viewports 1020 and 1022 overlap, as they both include the portion of computer desktop 1002 that contains the character, "I." Furthermore, it can be seen from this scenario that a viewport can span multiple desktop sections, as viewport 1020 includes portions of both desktop sections 1010 and 1012.

In addition, FIG. 10D illustrates that one viewport can "move past" another. That is, although viewport 1020 initially (i.e., in FIG. 10A) was to the left of viewport 1022, in FIG. 10D, viewport 1020 is now to the right of viewport 1022. Because both viewports 1020 and 1022 are still being displayed on display devices 1030 and 1032, respectively, in some embodiments, the physical position of display devices relative to one another may not correspond to the relative position on the computer desktop of content being displayed on each display device. However, in other embodiments, a discrepancy may be detected when the relative physical position of the display devices does not correspond to the relative position on the computer desktop of content to be displayed. Upon detecting such a discrepancy, viewports may automatically be mapped to different display devices in order to attempt to preserve a correspondence between the physical position of the display devices and the position on the computer desktop of the displayed content.

Figure 10E:
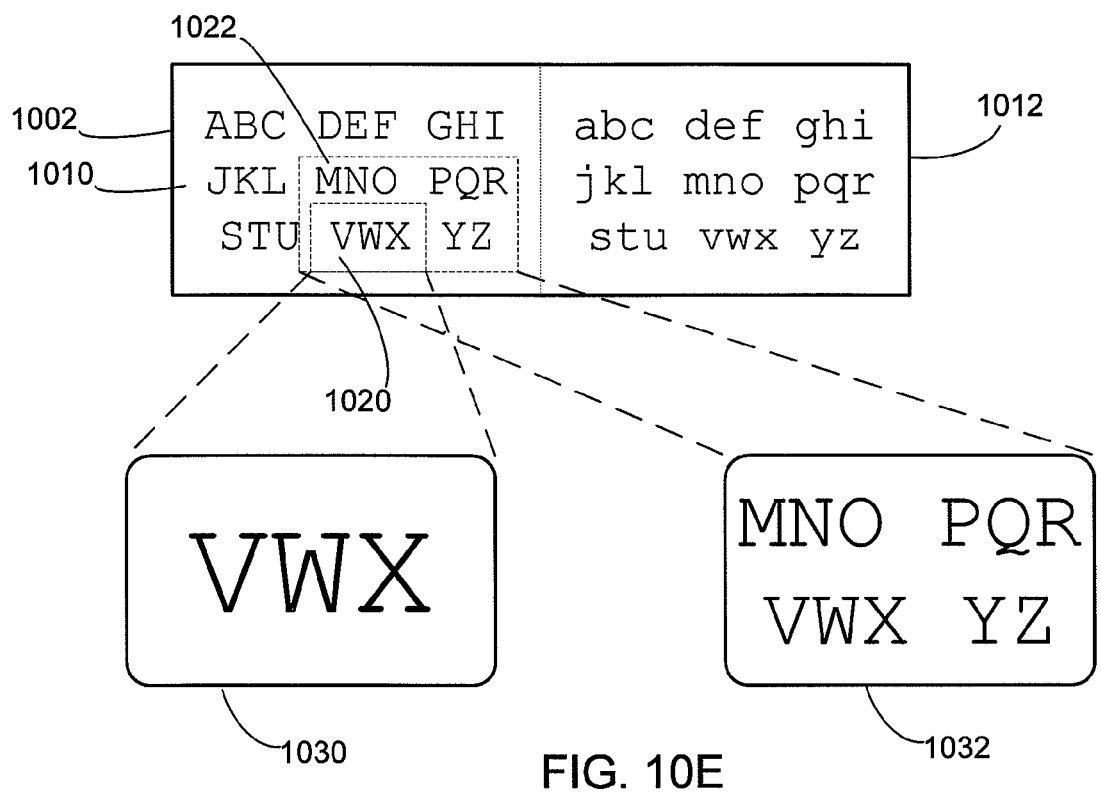
FIG. 10E is a diagram of a computer desktop display in which two viewports in overlapping positions with different magnification levels are each displayed on one of two connected display devices.

FIG. 10E illustrates a scenario in which two viewports have different magnification settings. In this example, viewport 1020 is set to magnify the relevant portion of computer desktop 1002 at a higher magnification level than the magnification level of viewport 1022. Thus, for example, viewport 1020 may be set to 4× magnification, while viewport 1022 may be set to 2× magnification, in which a magnification level of 1× indicates that the content is displayed at its original, unmagnified size. The magnification level and other types of enhancements may be configured by the user, may be automatically determined, or any suitable combination thereof. Also, while a magnification level may typically be set to be 1× or greater, some embodiments may support a magnification level less than 1×. This may be useful, for example, to create a viewport that encompasses an entire extended desktop. When that viewport is mapped to a single display device, that display device may effectively offer a "bird's eye view" of the extended desktop. Because an entire extended desktop is typically not displayed on a single display device, the magnification level for that viewport would be less than 1×. The magnification level of each viewport may be adjusted independently; that is, adjusting the magnification level of one viewports may not affect the magnification level of other viewports configured on the computer.

FIG. 10E further illustrates that multiple viewports may entirely overlap to the extent that one viewport may be wholly contained within another viewport. In the example of FIG. 10E, viewport 1020 is wholly contained within viewport 1022. This may be particularly useful in scenarios, as illustrated in FIG. 10E, for example, in which the two viewports have different magnification levels, as one viewport can then serve as a more detailed view of the other viewport. However, viewports may still wholly overlap even if they all are set to have the same magnification level.

Figure 10F:
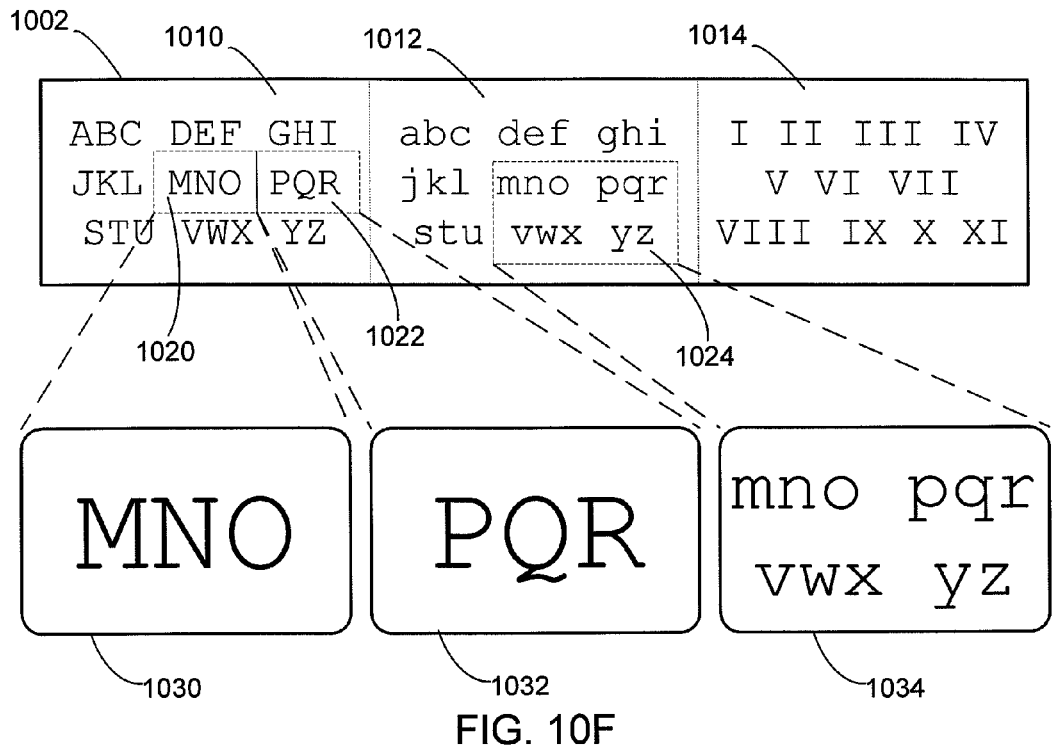
FIG. 10F is a diagram of a computer desktop display in which two viewports in a span link in initial positions and a third independent viewport are each displayed on one of three connected display devices.
Figure 10G:
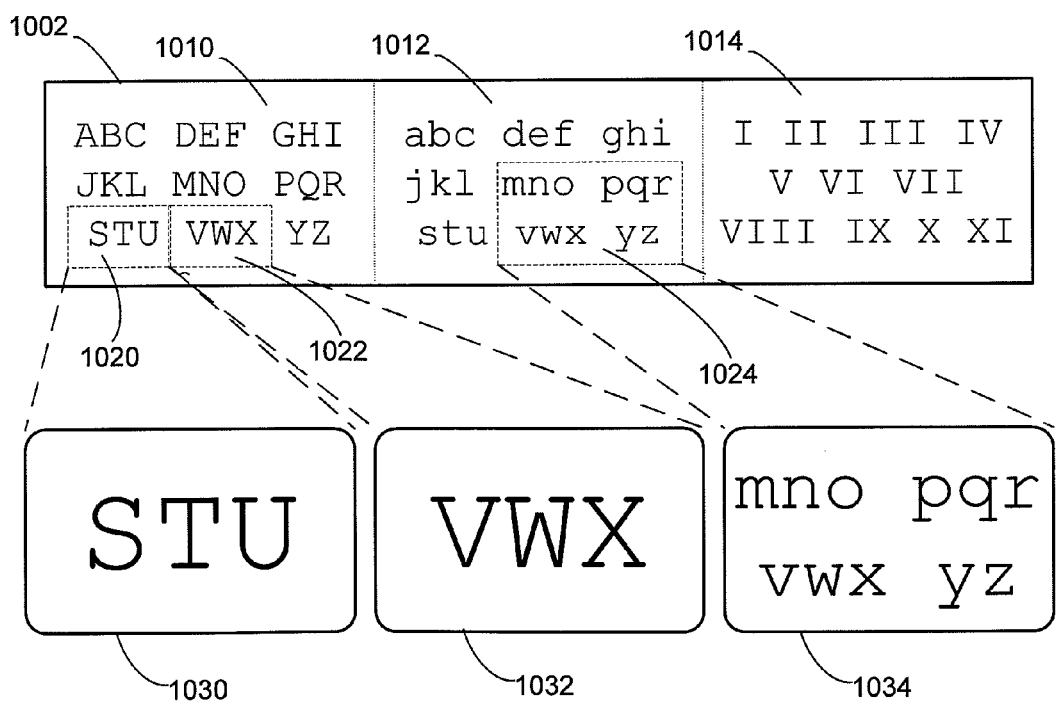
FIG. 10G is a diagram of a computer desktop display in which two viewports in a span link in subsequent positions and a third independent viewport are each displayed on one of three connected display devices.

FIGS. 10F-10G illustrate scenarios in which a computer has configured its connected display devices and viewports in a "hybrid span view" mode. In the examples of FIGS. 10F-10G, an additional display device is connected to the computer as compared to the examples of FIGS. 10A-10E. Thus, the computer is connected to a total of three display devices (i.e., display devices 1030, 1032 and 1034), and as the computer is configured in "extended desktop mode," the area of computer desktop 1002 has been increased accordingly to account for the increased number of display devices. Thus, computer desktop 1002 includes three sections (i.e., desktop sections 1010, 1012 and 1014). Three viewports are configured on the computer, viewports 1020, 1022 and 1024, which are mapped to display devices 1030, 1032 and 1034, respectively.

In "hybrid span view" mode, at least two viewports configured for a computer are linked so that they span together, while at least one third viewport is not linked in the same span, and moves independently of the other two linked viewports. Thus, in FIGS. 10F-10G, viewports 1020 and 1022 are linked so that adjusting the location or magnification of one of viewports 1020 or 1022 automatically adjusts the location or magnification of the other viewport accordingly. Viewport 1024, however, is independent of viewports 1020 and 1022, so that adjusting any one of viewports 1020 or 1022 does not adjust viewport 1024.

In the example of FIGS. 10F-10G, linked viewports 1020 and 1022 are always contiguous; that is, they always share a viewport boundary. In some embodiments, however, linked viewports need not be contiguous. Nevertheless, even if linked viewports are not contiguous, when one linked viewport is adjusted, all other viewports in the link span may also be adjusted by the same amount.

Furthermore, in some embodiments, all viewports in a link span may be configured with the same magnification level. If other types of enhancements are used besides magnification, such as color enhancement or highlighting, these other enhancements may or may not be configured identically for all viewports in a link span.

FIG. 10F shows linked viewports 1020 and 1022, as well as independent viewport 1024, in initial positions. As can be seen in FIGS. 10F and 10G, linked viewports 1020 and 1022 are configured to use the same magnification level, whereas viewport 1024 is configured for use with a different magnification level. Thus, in some embodiments, all viewports in a link span may be configured with identical magnification levels. If other types of enhancements are used in a link span, such as color enhancement or highlighting, in some embodiments, viewports in the link span may be set to have identical configurations or varying configurations of the other types of enhancements.

FIG. 10G shows a scenario in which one of linked viewports 1020 or 1022 has been adjusted. As can be seen from FIG. 10G, when one of the linked viewports has been adjusted, the other viewport in the link span is also adjusted accordingly. However, viewport 1024, which is independent of the link span, has not been adjusted, and still includes the same portion of computer desktop 1002 as in FIG. 10F. Because viewport 1024 is independent of viewports 1020 and 1022, viewport 1024 may be adjusted without adjusting either of viewports 1020 or 1022. It is to be appreciated that multiple link spans independent from each other may be configured on a computer. For example, if the computer in the scenario of FIGS. 10F-10G were connected to four displays rather than three, an additional viewport may be configured on the computer that is linked to viewport 1024. Thus, in this case, viewport 1024 and the additional fourth viewport may comprise an additional link span that is independent of the link span including viewports 1020 and 1022.

Figure 11:
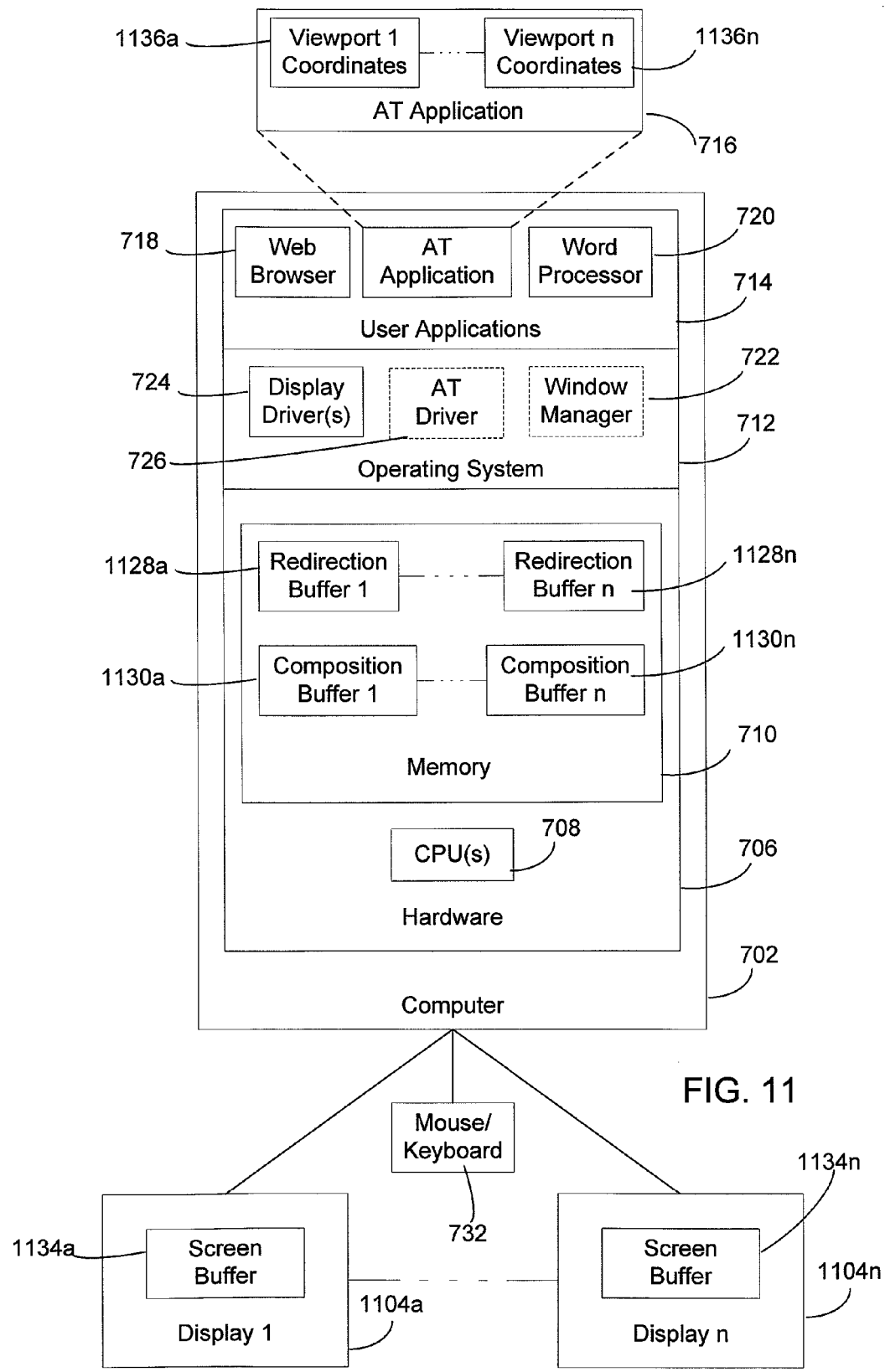
FIG. 11 is a block diagram of a computing system configured to enhance portions of visual content displayed on multiple display devices in accordance with some embodiments.

FIG. 11 is a block diagram of a computing system configured to enhance portions of visual content displayed on multiple display devices according to some embodiments. Thus, the computing system of FIG. 11 can implement scenarios such as those discussed in connection with FIGS. 10A-10G. The computing system of FIG. 11 is similar to that discussed in connection with FIG. 7, but in contrast to the system of FIG. 7 which only includes one display device, the computing system of FIG. 11 includes multiple display devices, illustrated in FIG. 11 as display devices 1104a and 1104n. Each of display devices 1104a . . . 1104n may have its own screen buffer, illustrated in FIG. 11 as screen buffer 1134a and 1134n, respectively. Accordingly, the computing system of FIG. 11 may be configured to display a separate viewport on each of the multiple display devices. In order to support multiple viewports, each viewport/display device may be associated with its own redirection buffer and composition buffer. Thus, display device 1104a is associated with redirection buffer 1128a and composition buffer 1030a, while display device 1104n is associated with redirection buffer 1128n and composition buffer 1130n. Similarly, because settings such as viewport coordinates may be particular to each viewport, included in AT application 716 are viewport settings for each viewport on the system, illustrated in FIG. 11 as viewport settings 1136a and 1136n.

Figure 12:
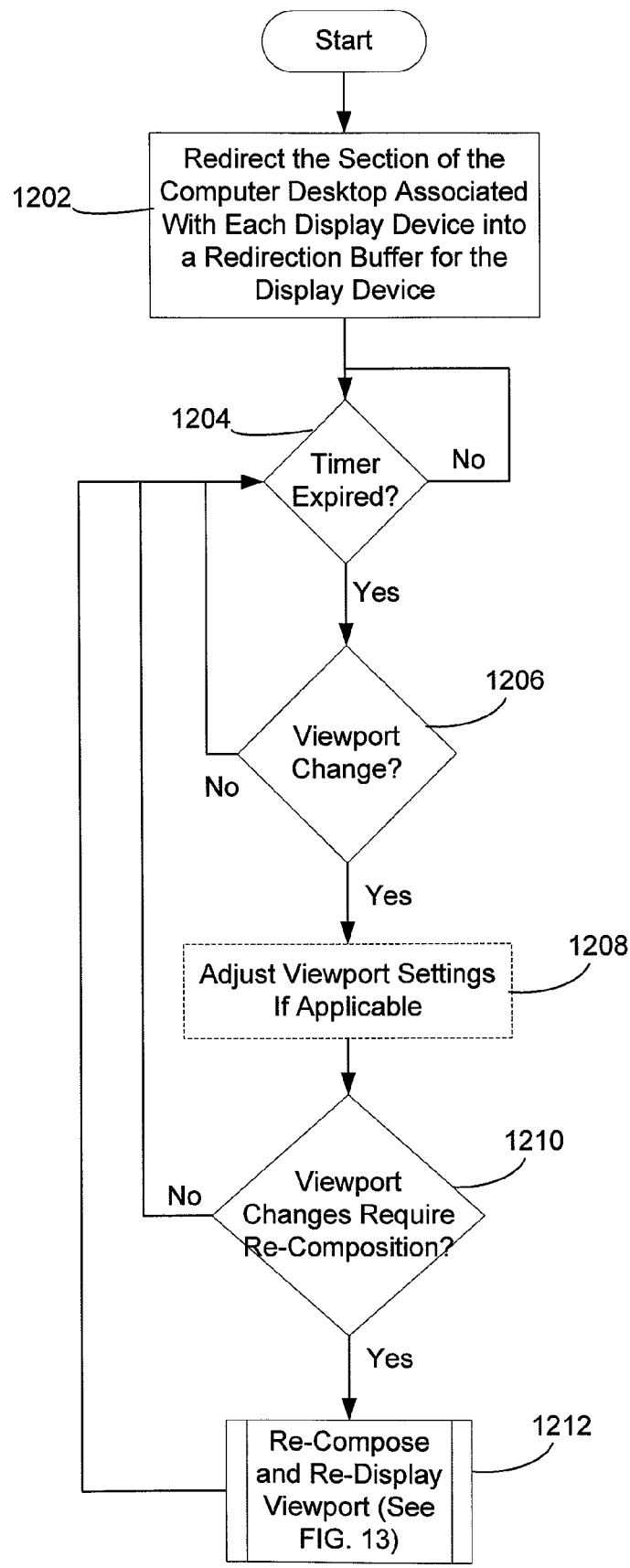
FIG. 12 is a flow chart of a process for enhancing and displaying a portion of visual content on multiple display devices connected to a computer in accordance with some embodiments.

FIG. 12 is a flow chart of a process for enhancing and displaying a portion of visual content on multiple display devices connected to a computer. While the process of FIG. 12 may be implemented with any suitable combination of hardware and software, in the following discussion, it is assumed that the process of FIG. 12 is implemented by the computing system including computer 702 illustrated in FIG. 11. While in the discussion that follows, the content is described as originating from a computer desktop, such as the computer desktop of computer 702 of FIG. 11, it should be appreciated that the content to be enhanced may originate from any source capable of producing visual content and conveying that content to the computer.

The process of FIG. 12 may start when AT software, which may include, for example, at least one of AT driver 726 and AT application 716, is launched on computer 702. According to some embodiments, the AT software may be configured to launch automatically at system boot or upon first installation of the AT software, while in other embodiments, the AT software may be started manually by the user or automatically at a subsequent time.

In some embodiments, the computer desktop may be configured in extended desktop mode. This configuration in extended desktop mode may be done automatically by the AT software, it may be configured manually by the user, or may be automated, for example, as part of an enterprise-wide script. In extended desktop mode, each display device is ordinarily (i.e., when AT software is not enabled or installed) mapped to display a different section of the extended desktop. Even though each display device may no longer be limited, after configuration of the AT software, to displaying its corresponding desktop section, it may still be useful to maintain the correspondence between a display device and its associated desktop section in order to leverage functionality provided by operating system 712.

Thus, the process of FIG. 12 begins at block 1202, when the AT software may configure computer 702, for some display device(s), to redirect the section of the computer desktop ordinarily associated with a display device to a corresponding redirection buffer for the display device (e.g., one of redirection buffers 1128a or 1128n). This redirection may be done in any suitable way, including according to any of the techniques discussed in connection with FIG. 7. It should be appreciated that, in some embodiments, all display devices may be configured to display redirected content of the computer desktop, while in other embodiments, only a subset of the display devices may be so configured. Furthermore, in embodiments in which the computer is configured to be in "extended desktop" mode, any suitable number of the display devices connected to the computer (including all display devices or a subset thereof) may be configured to be part of the "extended desktop."

According to the first technique discussed above (i.e., the driver chaining or driver interception technique) with multiple display devices, the current desktop section into which content is being drawn may be identified in a suitable way. For example, operating system 712 may be configured to have a separate display driver chain for each display device and its corresponding desktop section. In other environments, a call to display driver(s) 724 of operating system 712 may identify the current desktop section into which content is to be drawn. Thus, AT driver 726 may insert itself into each such display driver stack to intercept calls intended to be received and processed by display driver(s) 724. The interception may have the effect of causing visual content to be written first to a redirection buffer that corresponds to the desktop section, rather than being written immediately to the screen buffer for the display device that corresponds to the desktop section. The relevant content from the portions of redirection buffers associated with a particular viewport may then be copied by the AT software into the composition buffer associated with that viewport, and enhanced, as discussed above, before being displayed on the corresponding display device.

When using the second technique discussed above (i.e., layered windows technique) with multiple display devices, AT software may configure an "AT layered window" for each desktop section associated with a display device. Operating system 712, when configured to use "layered windows," may cause visual content intended to be drawn to a particular desktop section to be drawn to the redirection buffer that corresponds to that desktop section. As discussed above, AT software may then query operating system 712 for the contents of the relevant portions of the redirection buffers associated with a particular viewport to copy those portions into the composition buffer associated with that viewport, and, as discussed above, enhance the content in the associated composition buffer before displaying the enhanced content on the display device corresponding to the viewport.

In scenarios in which a windows manager, such as windows manager 722, is used with multiple display devices, windows manager 722 may use a separate back buffer for each desktop section associated with a display device. Accordingly, when using the third technique (i.e., windows manager technique), the AT software may cause windows manager 722 to redirect visual content updates to a redirection buffer associated with the desktop section, rather than writing visual content updates directly to the back buffer. To enhance the visual content, AT software may copy the relevant portions of the redirection buffers associated with a particular viewport into the composition buffer associated with the viewport. (As discussed above, the composition buffer for a viewport may be the back buffer associated with the display device onto which the viewport is configured to be displayed). The contents in the composition buffer may then be enhanced, as discussed above, before being displayed on the corresponding display device.

Regardless of the particular technique of redirecting visual content into a redirection buffer, in some embodiments, a component of the AT software, such as AT application 716, may be configured with a timer so that it periodically wakes up to perform processing. Thus, according to such embodiments, at block 1204, AT application 716 may check to determine if the timer has expired. If the timer has not yet expired, AT application 716 may temporarily suspend further processing and may go back to sleep. The process, therefore, returns to block 1204.

On the other hand, if it is determined at block 1204 that the timer has expired, then the AT application 716 wakes up, and the flow proceeds to block 1206, at which point the AT application may check to determine, for each viewport, if there are changes to the viewport. Viewport changes may include changes to viewport settings and/or changes to the visual content to be displayed in a viewport. Determining whether there is any change in visual content to be displayed may be done in any suitable way. For example, in some embodiments, the AT software may track changes internally, such as through a mirror driver, while in other embodiments, the AT software may be able to query operating system 702 for an indication of portions of the computer desktop that have changed. Similarly, detecting whether any viewport settings have changed may be done in any suitable way and may take into account any suitable settings. For example, a user may have provided input to a component of the AT software to indicate that the type of enhancement, such as magnification level, for a viewport should be changed (e.g., increased or decreased).

Another example of a viewport settings change may be a change in the currently active viewport. In some embodiments, the AT software may keep track of a currently "active viewport," which may be a viewport in which the user is currently working. In such embodiments, a user remains in the currently active viewport until the currently active viewport is changed to another viewport on the computer. A viewport change may be indicated by a user through a suitable type of input (e.g., particular hot key sequence, particular mouse movement), or it may be as the result of an event on the computer (e.g., a system alert requiring user input appearing in another viewport).

As an additional example, a viewport setting change may correspond to an indication that the coordinates that define a viewport should be changed, resulting in the position of the viewport being shifted to a different portion of the extended computer desktop. A viewport coordinates change may be detected in any suitable way. In one example, if the AT software is configured to have a viewport track the user's mouse movements, the AT application 716 may determine the current position of the mouse pointer. The current mouse pointer position may be determined in any suitable way, such as by issuing a query to operating system 712 using a published interface. Based on the current mouse pointer position, AT application 716 may be able to determine that the user has indicated that the viewport coordinates for the currently active viewport should be changed. For example, if the mouse cursor is outside the current viewport boundaries or within a pre-determined range of the viewport boundaries, than it may be an indication from the user that the currently active viewport coordinates should be changed. A viewport coordinates change for the currently active viewport may also be indicated by a particular key sequence received as input from the user. In general, any suitable user input using any suitable input device may be used as an indication of a user request to change viewport coordinates. In some embodiments, AT application 716 may additionally or alternatively determine, such as through an interface provided by operating system 712, the current user focus (e.g., an indication that a button received focus or an icon was highlighted). If the location of the current user focus is outside or within a predetermined range of the boundaries of the currently active viewport, the viewport coordinate settings may also be changed.

In some embodiments, the viewport coordinates for the currently active viewport may automatically be changed as the result of an event on computer 702. The event may be any suitable system initiated notification, such as a system alert or an error notification. For example, when a system alert is displayed in a portion of the desktop that is not currently visible in the currently active viewport, the AT software may be configured to automatically adjust the viewport coordinates for that viewport to encompass the portion of the desktop in which the alert appears, thereby allowing the user to see and respond to the alert. For example, on variants of the Microsoft Windows operating system, if a network cable is unplugged, an alert may appear in the notification area of the system tray. Because the notification area of the system tray is typically at the lower right-hand corner of the primary desktop, it is very possible that it may not be displayed in the currently active viewport, and therefore, such an alert could go unnoticed by the user. Thus, when so configured, the AT software could automatically adjust the viewport coordinates to include the notification area of the Windows system tray to enable the user to more easily be informed of the alert.

Regardless of the particular type of viewport change or of the particular manner of detecting such a change, at block 1208, in the case of a viewport settings change (rather than a change in the visual content to be displayed in a viewport) the process may apply any viewport setting changes detected at block 1206. This step may involve, for example, updating viewport settings 1136a through 1136n in AT application 716 or updating the currently active viewport.

At block 1210, the AT application may determine whether any of the viewport changes require one of the viewports to be re-composed (i.e., re-enhanced and re-displayed on a display device). If not, the process returns to block 1204, in which it may suspend further processing until the timer expires again. For example, a change of the currently active viewport in some embodiments may not in and of itself entail having to re-compose any viewports. On the other hand, a change in magnification level or a change to the visual content to be displayed in a viewport may typically involve re-composing the viewport. If it is determined at block 1210 that the viewport changes require a viewport to be re-composed, then at block 1212, the process may involve re-composing and re-displaying the contents of the affected viewport. Further details of block 1212 may be found in FIG. 13, discussed at greater length below. The process may then return to block 1204, in which it may suspend further processing until the timer expires. The process of FIG. 12 may continue ad infinitum until the AT software is no longer used to enhance any visual content.

It is to be appreciated that changes to a viewport that occur as the result of a viewport settings change (e.g., a change in magnification level or in a viewport boundary) may occur asynchronously with respect to changes in a viewport that occur as the result of a change in the visual content to be displayed in the viewport. That is, changes in viewport settings may be detected and applied to a viewport asynchronously from the detection and application of changes to a viewport that are the result of a change in visual content in a viewport. Accordingly, because the need for viewport updates may originate from various asynchronous sources, some embodiments may require viewport updates to be performed in a critical section in order to ensure that the visual content in a viewport is in a consistent state.

As one example of one type of asynchronous detection and updating of viewport changes, while the embodiment illustrated in FIG. 12 uses one timer, in some embodiments, multiple timers may be used to track viewport changes. In such embodiments, a first timer at a first timer granularity in a first thread of execution may be used as part of tracking a change in viewport settings, whereas a second timer at a second timer granularity in a second thread of execution may be used as part of tracking whether the visual content to be displayed in any of the viewports has changed. Because changes to visual content may typically occur much more frequently than viewport setting changes, the granularity of the second timer may be finer (i.e., the second timer may wake up more often) than that of the first timer. However, in other embodiments, the first timer may have a finer granularity than the second timer, for example, to ensure that any change in viewport settings is reflected as soon as possible.

As another example of asynchronous updates, while changes to visual content to be displayed in a viewport may be tracked using a timer in a first thread, viewport setting changes may not be tracked using a timer, at all. Instead, a second thread may monitor events on the computer to determine if they require a change in viewport settings. For example, the mouse movement may be tracked in this second thread to determine if the position of the mouse cursor requires a change to be made in a viewport boundary. In such embodiments, the second thread may also monitor user or system events that may indicate a change in active viewport or a change in viewport magnification or filter settings, for example. Upon determining that an event requires a change in viewport settings, the changes may be applied in any suitable way. For example, the second thread may apply the changes immediately, or queue them up to be processed later by a worker thread.

Figure 13:
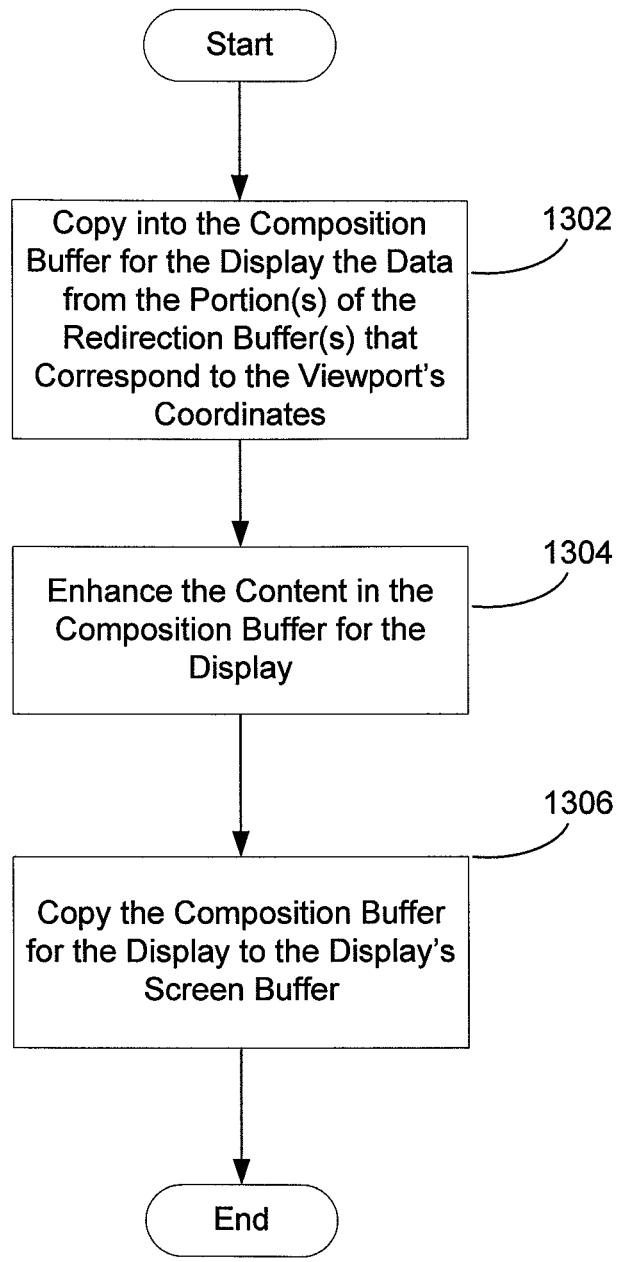
FIG. 13 is a flow chart of a process of enhancing and displaying a portion of visual content that may be used in the process of FIG. 12 in accordance with some embodiments.

FIG. 13 is a flow chart of a process of enhancing and displaying visual content. FIG. 13 may be called as a result of a determination that changes in a viewport (whether due to a change in viewport settings or due to a change in the visual content of the viewport) require a viewport update. Thus, FIG. 13 may provide more details of block 1212 in the process of FIG. 12. For example, FIG. 13 may be called when the AT software receives a notification from one of user applications 714 or from operating system 712 that content on a viewport needs to be updated or when a viewport setting change requires viewport re-composition. The process of FIG. 13 may be performed for each viewport that is to be updated, whether the viewport is to be updated because of new visual content, new viewport settings, or some combination of the two.

At block 1302, AT software may copy into the composition buffer for the display device associated with the viewport the portion(s) of visual content from the redirection buffer(s) that correspond to the coordinates of the viewport. As discussed above and illustrated in FIGS. 8 and 10D, a viewport may encompass data from multiple sections of the computer desktop, and therefore, from multiple redirection buffers. The portion(s) of the redirection buffer(s) that correspond to the viewport coordinates are copied at block 1302 into the composition buffer for the display device associated with the current viewport. Copying contents of a redirection buffer into a composition buffer may be done in any suitable way, including using any of the techniques discussed in connection with FIG. 7.

At block 1304, the contents of the composition buffer may then be enhanced in any suitable way, as discussed above in connection with FIG. 7. As discussed above, in some embodiments, the visual content may be enhanced during the copy operation from the redirection buffer to the composition buffer (e.g., in block 1302). As illustrated in FIG. 13, however, the enhancement processing may additionally or alternatively be performed in the composition buffer after the copy operation is complete.

At block 1306, the contents of the composition buffer may then be copied to the screen buffer for the display device associated with the viewport. The display device associated with the viewport may then display the content on the screen.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of displaying and panning magnified sections of an extended computer desktop on first and second display devices, the extended computer desktop being divided by a boundary into at least a first section corresponding to the first display device and a second section corresponding to the second display device, the method comprising:

displaying a first viewport of the extended computer desktop on the first display device, wherein the first viewport redisplays a first portion of the extended computer desktop magnified at a first magnification level on the first display device;

displaying a second viewport of the extended computer desktop on the second display device, wherein the second viewport redisplays a second portion of the extended computer desktop magnified at a second magnification level on the second display device;

providing a first control via which a user can pan the extended computer desktop displayed at the first magnification level within the first viewport on the first display device, independently of the second viewport of the extended computer desktop displayed on the second display device, whereby the user can pan the extended computer desktop in its entirety within the first viewport including panning across the boundary between the first section and the second section of the extended computer desktop; and providing a second control via which the user can pan the extended computer desktop displayed at the second magnification level within the second viewport on the second display device, independently of the first viewport of the extended computer desktop displayed on the first display device, whereby the user can pan the extended computer desktop in its entirety within the second viewport including panning across the boundary between the first section and the second section of the extended computer desktop.

2. The method of claim 1, wherein the first magnification level is different from the second magnification level.

3. The method of claim 1, wherein providing the first control comprises providing a user interface by which the user may change the first magnification level.

4. The method of claim 1, wherein providing the second control comprises providing a user interface by which the user may change the second magnification level.

5. The method of claim 1, wherein providing the first control comprises providing a first control via which the user may adjust a position of the first viewport relative to the extended computer desktop without adjusting a position of the second viewport relative to the extended computer desktop.

6. The method of claim 5, wherein providing the second control comprises providing a second control via which the user may adjust a position of the second viewport relative to the extended computer desktop without adjusting a position of the first viewport relative to the extended computer desktop.

7. The method of claim 1, wherein the method further comprises:
displaying a third viewport of the extended computer desktop on a third display device; and
providing a third control via which the user can pan the extended computer desktop displayed within the third viewport independently of the first viewport of the extended computer desktop displayed on the first display device and independently of the second viewport of the extended computer desktop displayed on the second display device.

8. The method of claim 7, wherein providing the second control comprises providing a second control via which the user can pan the extended computer desktop displayed within the second viewport independently of the first viewport of the extended computer desktop that is displayed on the first display device and independently of the third viewport of the extended computer desktop that is displayed on the third display device.

9. A non-transitory computer-readable storage medium comprising computer executable instructions, that, when executed on at least one processor in a computer, perform a method of displaying and panning magnified sections of an extended computer desktop on first and second display devices, the extended computer desktop being divided by a boundary into at least a first section corresponding to the first display device and a second section corresponding to the second display device, the method comprising:

displaying a first viewport of the extended computer desktop on the first display device, wherein the first viewport redisplays a first portion of the extended computer desktop magnified at a first magnification level on the first display device;

displaying a second viewport of the extended computer desktop on the second display device, wherein the second viewport redisplays a second portion of the extended computer desktop magnified at a second magnification level on the second display device;

panning the extended computer desktop displayed at the first magnification level within the first viewport displayed on the first display device, independently of the second viewport of the extended computer desktop displayed on the second display device, thereby enabling panning of the extended computer desktop in its entirety within the first viewport including panning across the boundary between the first section and the second section of the extended computer desktop; and panning the extended computer desktop displayed at the second magnification level within the second viewport displayed on the second display device, independently of the first viewport of the extended computer desktop displayed on the first display device, thereby enabling panning of the extended computer desktop in its entirety within the second viewport including panning across the boundary between the first section and the second section of the extended computer desktop.

10. The computer-readable storage medium of claim 9, wherein the second magnification level is different from the first magnification level.

11. The computer-readable storage medium of claim 9, wherein panning the first viewport of the extended computer desktop displayed on the first display device is performed in response to user input.

12. The computer-readable storage medium of claim 9, wherein panning the extended computer desktop within the first viewport displayed on the first display device is performed in response to a system-initiated notification on the computer.

13. The computer-readable storage medium of claim 9, wherein panning the extended computer desktop within the first viewport displayed on the first display device is performed in response to a change in a current user focus.

14. The computer-readable storage medium of claim 9, wherein panning the extended computer desktop within the first viewport displayed on the first display device is performed when a current position of a mouse cursor is within a predetermined range of a boundary of the first viewport of the extended computer desktop displayed on the first display device.

15. The computer-readable storage medium of claim 9, wherein the first magnification level of the first viewport is adjustable independently of the second magnification level of the second viewport.

16. The computer-readable storage medium of claim 9, wherein the second magnification level of the second viewport is adjustable independently of the first magnification level of the first viewport.

17. A system comprising:
a computer comprising at least one processor, the computer being configured with machine-readable instructions that, when executed on the at least one processor, perform a method of displaying and panning magnified sections of an extended computer desktop on first and second display devices, the extended computer desktop being divided by a boundary into at least a first section corresponding to the first display device and a second section corresponding to the second display device, the method comprising:
- displaying a first viewport of the extended computer desktop on the first display device, wherein the first viewport redisplays a first portion of the extended computer desktop magnified at a first magnification level on the first display device;
- displaying a second viewport of the extended computer desktop on the second display device, wherein the second viewport redisplays a second portion of the extended computer desktop magnified at a second magnification level on the second display device;
- panning the extended computer desktop displayed at the first magnification level within the first viewport displayed on the first display device, independently of the second viewport of the extended computer desktop displayed on the second display device, thereby enabling panning of the extended computer desktop in its entirety within the first viewport including panning across the boundary between the first section and the second section of the extended computer desktop
- panning the extended computer desktop displayed at the second magnification level within the second viewport displayed on the second display device, independently of the first viewport of the extended computer desktop that is displayed on the first display device, thereby enabling panning of the extended computer desktop in its entirety within the second viewport including panning across the boundary between the first section and the second section of the extended computer desktop.

18. The system of claim 17, wherein the extended computer desktop comprises visual content from at least one visual content source device connected to the computer, and wherein the at least one visual content source device comprises at least one source selected from the group consisting of: a video camera, a closed caption television (CCTV), and a TV tuner.

19. The system of claim 17, wherein the extended computer desktop comprises visual content drawn by an application executing on the computer.

20. The system of claim 17, wherein
- the second magnification level is different from the first magnification level.

21. The system of claim 19, wherein:
- panning the extended computer desktop within the first viewport displayed on the first display device independently of the second viewport of the extended computer desktop that is displayed on the second display device comprises moving the position relative to the extended computer desktop of the first viewport of the extended computer desktop displayed on the first display device without moving the position relative to the extended computer desktop of the second viewport of the extended computer desktop displayed on the second display device; and
- panning the extended computer desktop within the first viewport displayed on the second display device independently of the first viewport of the extended computer desktop that is displayed on the first display device comprises moving the position relative to the extended computer desktop of the second viewport of the extended computer desktop displayed on the second display device without moving the position relative to the extended computer desktop of the first magnified viewport of the extended computer desktop displayed on the first display device.

* * * * *